United States Patent [19]

Sawase et al.

[11] Patent Number: 5,426,744
[45] Date of Patent: Jun. 20, 1995

[54] SINGLE CHIP MICROPROCESSOR FOR SATISFYING REQUIREMENT SPECIFICATION OF USERS

[75] Inventors: Terumi Sawase, Hanno; Yoshimune Hagiwara, Hachioji; Hideo Nakamura, Tokyo; Hiroyuki Hatori, Takasaki; Shirou Baba, Tokorozawa; Yasushi Akao, Kokubunji, all of Japan

[73] Assignee: Hitachi, Ltd., Tokyo, Japan

[21] Appl. No.: 203,761

[22] Filed: Mar. 1, 1994

Related U.S. Application Data

[63] Continuation of Ser. No. 414,315, Sep. 29, 1989, abandoned.

[30] Foreign Application Priority Data

Sep. 30, 1988 [JP] Japan .................. 63-244156

[51] Int. Cl.$^6$ .................................. G06F 9/26
[52] U.S. Cl. .................. 395/375; 364/DIG. 1
[58] Field of Search ............ 395/800, 375, 650; 371/21.2

[56] References Cited

U.S. PATENT DOCUMENTS

| | | | |
|---|---|---|---|
| 3,689,959 | 9/1972 | Kitamura | 395/375 |
| 3,881,173 | 4/1975 | Larsen et al. | 395/375 |
| 4,005,391 | 1/1977 | MacPherson | 395/275 |
| 4,192,007 | 3/1980 | Becker | 364/721 |
| 4,197,579 | 4/1980 | Otis, Jr. et al. | 395/375 |
| 4,320,453 | 3/1982 | Roberts et al. | 395/775 |
| 4,339,657 | 7/1982 | Larson et al. | 371/5.1 |
| 4,349,870 | 9/1982 | Shaw et al. | 395/800 |
| 4,387,444 | 6/1983 | Edwards | 365/185 |
| 4,470,113 | 9/1984 | Oura | 395/325 |
| 4,578,750 | 3/1986 | Amdahl et al. | 395/375 |
| 4,586,127 | 4/1986 | Horvath | 395/375 |
| 4,609,986 | 9/1986 | Hartmann et al. | 395/800 |
| 4,794,558 | 12/1988 | Thompson | 395/800 |
| 4,905,142 | 2/1990 | Matsubara | 371/21.2 |
| 4,905,191 | 2/1990 | Arai | 371/21.2 |
| 5,117,498 | 5/1992 | Miller et al. | 395/775 |
| 5,159,674 | 10/1992 | Stadlmeier et al. | 395/375 |

FOREIGN PATENT DOCUMENTS 0086307 8/1983 European Pat. Off. .
61-285567 10/1985 Japan .

OTHER PUBLICATIONS

McMorrow, "In-Circuit logic device can be reprogrammed on the fly," Electronic Design, Aug. 7, 1986, pp. 94-97.

Abiko et al., "Architecture and Applications of a 100-ns CMOS VLSI Digital Signal Processor," ICASSP 86 conference precedings, Apr. 1986, pp. 393-396.

Goss, "Single Chip Microcomputer with EPROM Allows Flexible System Design," Wescon Technical Papers, vol. 27, 1983, pp. 34/2 1-4.

Lilen, "L Série 40: une famille de microsystémes 4 bits en CMOS," Electronique Industrielle, Nov. 1980, pp. 43-44.

Butterworth & Co., "TMS 320C25 digital signal processor," Microprocessors & Microsystems, vol. 12, No. 9, Nov. 1988, pp. 505-512.

*Primary Examiner*—Parshuiam S. Lall
*Assistant Examiner*—Richard Lee Ellis
*Attorney, Agent, or Firm*—Antonelli, Terry, Stout & Kraus

[57] ABSTRACT

A typical single chip microcomputer disclosed in the present application comprises a control circuit, a processing circuit and a plurality of address register—status register pairs. A logical unit formed within the control circuit comprises an electrically writable non-volatile-semiconductor memory device. Information can be externally written into the non-volatile semiconductor memory included in the logical unit, and the above described plurality of address register—status register pairs can be arbitrarily selected. As a result, logic function of the logical unit can be arbitrarily established in accordance with externally supplied information. Demanded specifications of various users can be satisfied by the logic function thus arbitrarily formed.

22 Claims, 27 Drawing Sheets

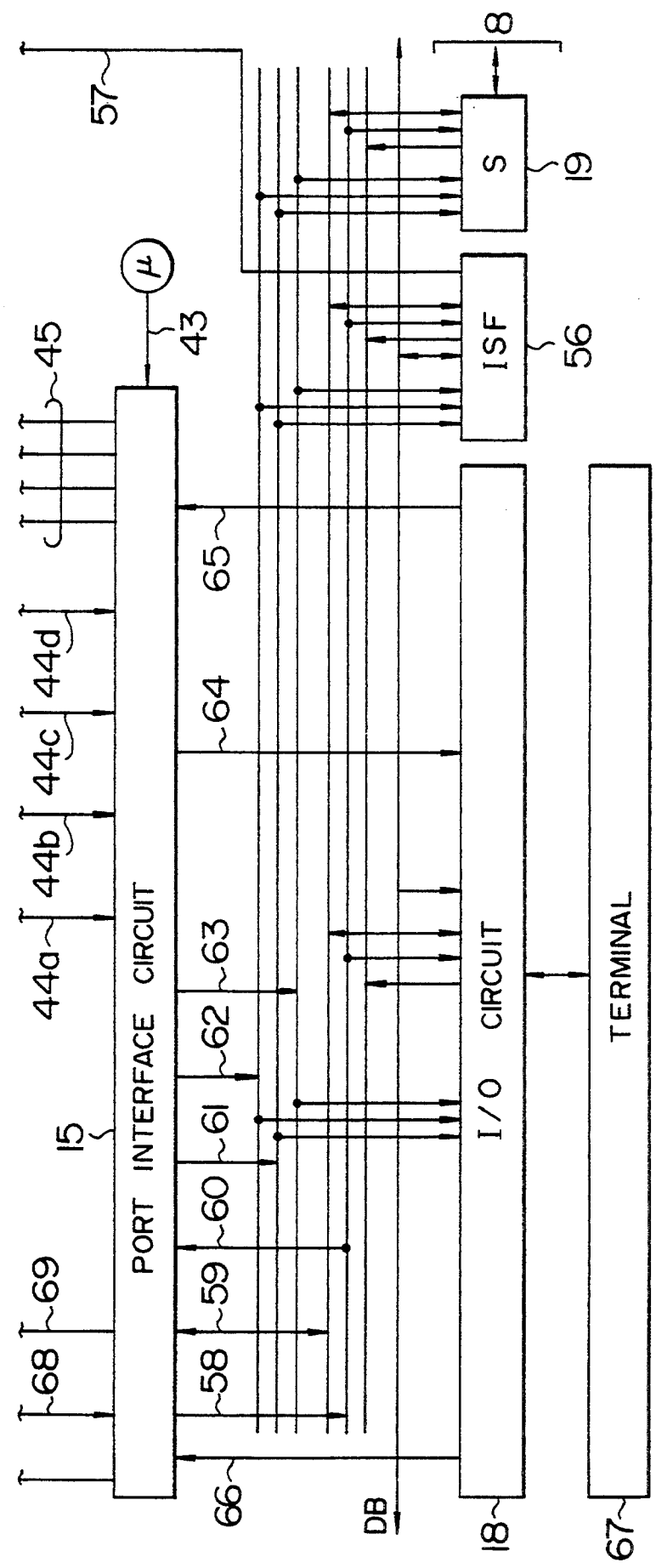

FIG. 4A

| | INSTRUCTION | OPERATION | FLAG (O: CHANGE) C | FLAG (O: CHANGE) Z | DATA LENGTH | REMARKS |
|---|---|---|---|---|---|---|
| GENERAL INSTRUCTION | MOVE | Rs (Imm) → Rd | — | O | B/W | |
| | ADD / Ci | Rd (Imm) + Rs + Cin → Rd<br>Ci: 0, 1, CF, Pi | O | O | B/W | |
| | SUB / Ci | Rd − Rs (Imm) − Cin → Rd<br>Ci: 0, 1, CF, Pi | O | O | B/W | |
| | CMP | Rd − Rs (Imm) | O | O | B/W | |
| | AND | Rd ∧ Rs (Imm) → Rd | — | O | B/W | |
| | OR | Rd ∨ Rs (Imm) → Rd | — | O | B/W | |
| | EOR | Rd ⊕ Rs (Imm) → Rd | — | O | B/W | |
| | LSL / Ci | [Cin → Rs → Rd → C]<br>Cin: 0, 1, C, Pi | O | O | B/W | |
| | LSR / Ci | [Cin → Rs → Rd → C] | O | O | B/W | |
| | NOP | | — | — | — | |

FIG. 4B

| | | | | | |
|---|---|---|---|---|---|
| TIMER INSTRUCTION | INCCLR | (INC/CMP diagram with CF/ZF, "0", Ri, Rc) | ○ | #○ | B/W | INCCLR Ri (or Imm), Rc<br>if (Rc==Ri)  Rc=0<br>else  Rc=Rc+1<br><br>#: REFLECT RESULT OF COMPARATOR |
| | INCCMP | (INC/CMP diagram with CF/ZF, Ri, Rc) | ○ | #○ | B/W | INCCMP Ri (or Imm), Rc<br>Rc=Rc+1<br><br>#: REFLECT RESULT OF COMPARATOR |
| | DECLD | (DEC diagram with CF/ZF, Ri, Rc) | — | *○ | B/W | DECLD Ri (or Imm), Rc<br>if (Rc−1==0)  Rc=Ri<br>else  Rc=Rc−1 |
| MEMORY ACCESS INSTRUCTION | WRSET | Rs(Imm) → DATA BUFFER | — | *○ | B | |
| | WRSTART | Rs(Imm) → ADDRESS BUFFER START WRITE CYCLE | — | *○ | W | |
| | RDSTART | Rs(Imm) → ADDRESS BUFFER START READ CYCLE | — | *○ | W | |
| | RDGET | DATA BUFFER → Rd | — | *○ | B | |
| | REF | Rs(Imm) → ADDRESS BUFFER START REFRESH CYCLE | — | *○ | B/W | LOADED INTO LOW ORDER OF ADDRESS BUFFER AT THE TIME OF BYTE (B) SPECIFICATION |

*IN CASE OF SUCCESS, ZERO FLAG (ZF)=1
IN CASE OF FAILURE, ZERO FLAG (ZF)=0

FIG. 5

| GENERAL PURPOSE | | | SPECIAL PURPOSE |
|---|---|---|---|
| | 15　　　　87 | 　　　　　0 | |
| R0 | R0H | R0L | *1 ROCT0 |
| R1 | R1H | R1L | *2 ROCB0 |
| R2 | R2H | R2L | *1 ROCT1 |
| R3 | R3H | R3L | *2 ROCB1 |
| R4 | R4H | R4L | *1' ROCT2 (ROCT2H/ROCT2L) |
| R5 | R5H | R5L | *2' ROCB2 (ROCB2H/ROCB2L) |
| R6 | R6H | R6L | *1' ROCT3 (ROCT3H/ROCT3L) |
| R7 | R7H | R7L | *2' ROCB3 (ROCB3H/ROCB3L) |
| R8 | R8H | R8L | *3 RIC0 |
| R9 | R9H | R9L | *3 RIC1 |
| R10 | R10H | R10L | *3 RIC2 |
| R11 | R11H | R11L | *3 RIC3 |
| R12 | R12H | R12L | |
| R13 | R13H | R13L | |
| R14 | R14H | R14L | |
| R15 | R15H | R15L | *4 |
| R16 | R16H | R16L | |
| R17 | R17H | R17L | |
| R18 | R18H | R18L | |
| R19 | R19H | R19L | |
| | RIMMH | RIMML | *5 RIMM |
| | RFRTH | RFRTL | *6 RFRT |

FIG. 11A

| AND INPUT | | OUTPUT | |
|---|---|---|---|
| Ev | FB | NEXT STATE | CONTROL |
| X | S 0 | S 1 | F 0 |
| X | S 1 | S 2 | F 1 |
| X | S 2 | S 3 | F 3 |
| X | S 3 | S 4 | F 4 |
| X | S 4 | S 5 | F 0 |
| X | S 5 | S 6 | F 5 |
| X | S 6 | S 7 | F 6 |
| X | S 7 | S 8 | F 7 |
| X | S 8 | S 9 | F 0 |
| X | S 9 | S 10 | F 2 |
| X | S 10 | S 11 | F 3 |
| X | S 11 | S 12 | F 4 |
| X | S 12 | S 13 | F 0 |
| X | S 13 | S 14 | F 5 |
| X | S 14 | S 15 | F 6 |
| X | S 15 | S 0 | F 7 |

FIG. 11B

| AND INPUT | | OUTPUT | |
|---|---|---|---|
| Ev | FB | NEXT STATE | CONTROL |
| X | S 0 | S 1 | F 0 |
| X | S 1 | S 2 | F 1 |
| X | S 2 | S 3 | F 2 |
| X | S 3 | S 4 | F 3 |
| Ev 3 | S 4 | S 0 | F 4 |
| Ev 2 | S 4 | S 0 | F 5 |
| Ev 1 | S 4 | S 0 | F 6 |
| Ev 0 | S 4 | S 0 | F 7 |

FIG. 17

| AND INPUT | | OUTPUT | | |
|---|---|---|---|---|
| Ev | FB | NEXT STATE | CONTROL | I |
| X | S0' | S1' | F0 | 1 |
| X | S1' | S2' | F1 | 1 |
| X | S2' | S3' | F2 | 1 |
| X | S3' | S4' | F3 | 1 |
| X | S4' | S5' | F4 | 1 |
| X | S5' | S6' | F5 | 1 |
| X | S6' | S7' | F6 | 1 |
| X | S7' | S0 | F7 | 1 |
| X | S0 | S1 | F0 | 0 |
| X | S1 | S2 | F1 | 0 |
| X | S2 | S3 | F3 | 0 |
| X | S3 | S4 | F4 | 0 |
| X | S4 | S5 | F0 | 0 |
| X | S5 | S6 | F5 | 0 |
| X | S6 | S7 | F6 | 0 |
| X | S7 | S8 | F7 | 0 |
| X | S8 | S9 | F0 | 0 |
| X | S9 | S10 | F2 | 0 |
| X | S10 | S11 | F3 | 0 |
| X | S11 | S12 | F4 | 0 |
| X | S12 | S13 | F0 | 0 |
| X | S13 | S14 | F5 | 0 |
| X | S14 | S15 | F6 | 0 |
| X | S15 | S0 | F7 | 0 |

Rows 1–8: group ①
Rows 9–24: group ②

SINGLE CHIP MICROPROCESSOR FOR SATISFYING REQUIREMENT SPECIFICATION OF USERS

This application is a continuation application of Ser. No. 07/414,315, filed Sep. 29, 1989, now abandoned.

BACKGROUND OF THE INVENTION

The present invention relates to a semiconductor integrated circuit, and in particular to a single chip microcomputer (hereafter referred to simply as a microcomputer). Further, the present invention relates to a semiconductor integrated circuit suitable for significantly reducing the number of components constituting a system and suitable for shortening the development interval of an application system.

In apparatus of the prior art, a microcomputer and a PLA (programmable logic array) are fabricated to form one chip, and the PLA functions in response to an external input irrespective of the program of the microcomputer. Outputs of the PLA then activate various functions and the microcomputer is started by the result of these functions.

The PLA is a logic circuit apparatus having a variable logic structure, the logic function of which can be arbitrarily constructed using an electrical write operation to a non-volatile semiconductor memory device.

On the other hand, an improved PLA using the EPROM technique is disclosed in U.S. Pat. No. 4,609,986.

Further, a semiconductor integrated circuit apparatus having a data processing unit, such as a CPU and a non-volatile memory block for storing therein software in an identical chip, has been disclosed in JP-A-60-198667.

On the other hand, electrically writable logic devices are discussed in the products catalogue of Altera Corporation, p. 12 or Electronic Design, Aug. 7, 1986 pp. 94 to 97.

The prior art apparatus disclosed in the aforementioned JP-A-61-285567 has the effect of reducing the number of components in some applications. However, the applicability of this prior art apparatus to general use is not available, and hence a wide range of applications cannot be covered, resulting in a problem. Further, the aforementioned U.S. Pat. No. 4,609,986 discloses only the PLA itself. This patent discloses only provision of a desired single chip microcomputer to the user in a short delivery time achieved by integrating the PLL, i.e., integrating the programmable logic circuit and the microcomputer into one chip, by constituting a memory block for storing therein a program, which constitutes the software of the single chip microcomputer, in the form of a non-volatile memory, and by writing the program into the non-volatile memory for storing the program from the outside of the chip under the directive of the user itself. Ways of allowing the user to freely construct a logic apparatus for implementing the hardware of a single chip microcomputer have not been considered.

The software (program) of the single chip microcomputer is developed, and the software thus developed is written into the ROM (read only memory) of the memory block of the single chip microcomputer. If this ROM is composed of a non-volatile memory and the user freely writes the program into this nonvolatile memory from the outside of the chip, the user can obtain a single chip microcomputer containing the desired software in a short time.

As for the hardware of the single chip microcomputer, respective users often specify various requirements. Therefore, it is not possible to satisfy simultaneously various requirements of the user with unified hardware. In the prior art, therefore, a random logic circuit or the like is added as an external circuit of the single chip microcomputer in order to realize requirements of respective users, resulting in problems involving the need for a large number of components used in the overall system and a large mounting area. A basic configuration of a single chip microcomputer for solving this problem is already disclosed in JP-B-63-91563 (U.S. Pat. application Ser. No. 238,534, filed on Aug. 31, 1988 in United States now abandoned).

As examples of the hardware of a single chip microcomputer for which respective users have their peculiar specifications, various examples such as a key input encoder (which is an encoder for converting information inputted from a keyboard and for taking the resultant information into the single chip microcomputer), a display decoder (a decoder for converting information outputted from the single chip microcomputer and for driving a display unit), a time measuring timer and a serial communication circuit can be mentioned.

SUMMARY OF THE INVENTION

An object of the present invention is to provide a logic configuration and circuit configuration suitable for implementing a higher speed and a minimized chip size in implementing the single chip microcomputer disclosed in the above described patent application in an LSI form.

Other objects of the present invention will be made clear from the following description and drawings.

In accordance with a representative aspect of the invention disclosed in the present application, a logic unit formed within a single chip microcomputer comprises a control circuit having an electrically writable non-volatile semiconductor memory device, a processing circuit and a plurality of pairs of address registers and status registers.

From the outside of the chip, the user can write information into the non-volatile semiconductor memory included in this logic unit. The control circuit is so configured that it may arbitrarily select one pair out of the above described plurality of pairs of address registers and status registers in response to information thus written into the non-volatile semiconductor memory.

Owing to the above described configuration, the above described pair of an address register and a status register can be selectively connected to one processing circuit. Since the logic function of the logic unit can thus be arbitrarily formed in response to information written into the non-volatile semiconductor memory, it is possible to satisfy specifications of various users with the logic functions thus formed arbitrarily.

Further, by defining independently as many functions as the above described pairs of address registers and status registers and by controlling selection of those pairs of address registers and status registers in a time division scheme, an operation which gives the appearance that a plurality of independent programs are operating can be realized by using a single processing circuit.

BRIEF DESCRIPTION OF THE DRAWINGS

FIG. 3a and 3b are a detailed configuration diagram of the subprocessor and, a programmable I/O per channel.

FIG. 4a and 4b are a diagram showing instructions specified in a micro EPROM.

FIG. 5 is a diagram showing the configuration of a register.

FIGS. 11A and 11B are diagrams showing program of the control PLA of FIG. 10

FIG. 17 is a diagram showing the program of a control PLA of FIG. 16.

FIG. 22B-1 and 22B-2 are diagrams showing a test sequence of the circuit of FIG. 22A.

DESCRIPTION OF THE PREFERRED EMBODIMENTS

Preferred Embodiments of the present invention will hereafter be described in detail.

Figure 2:
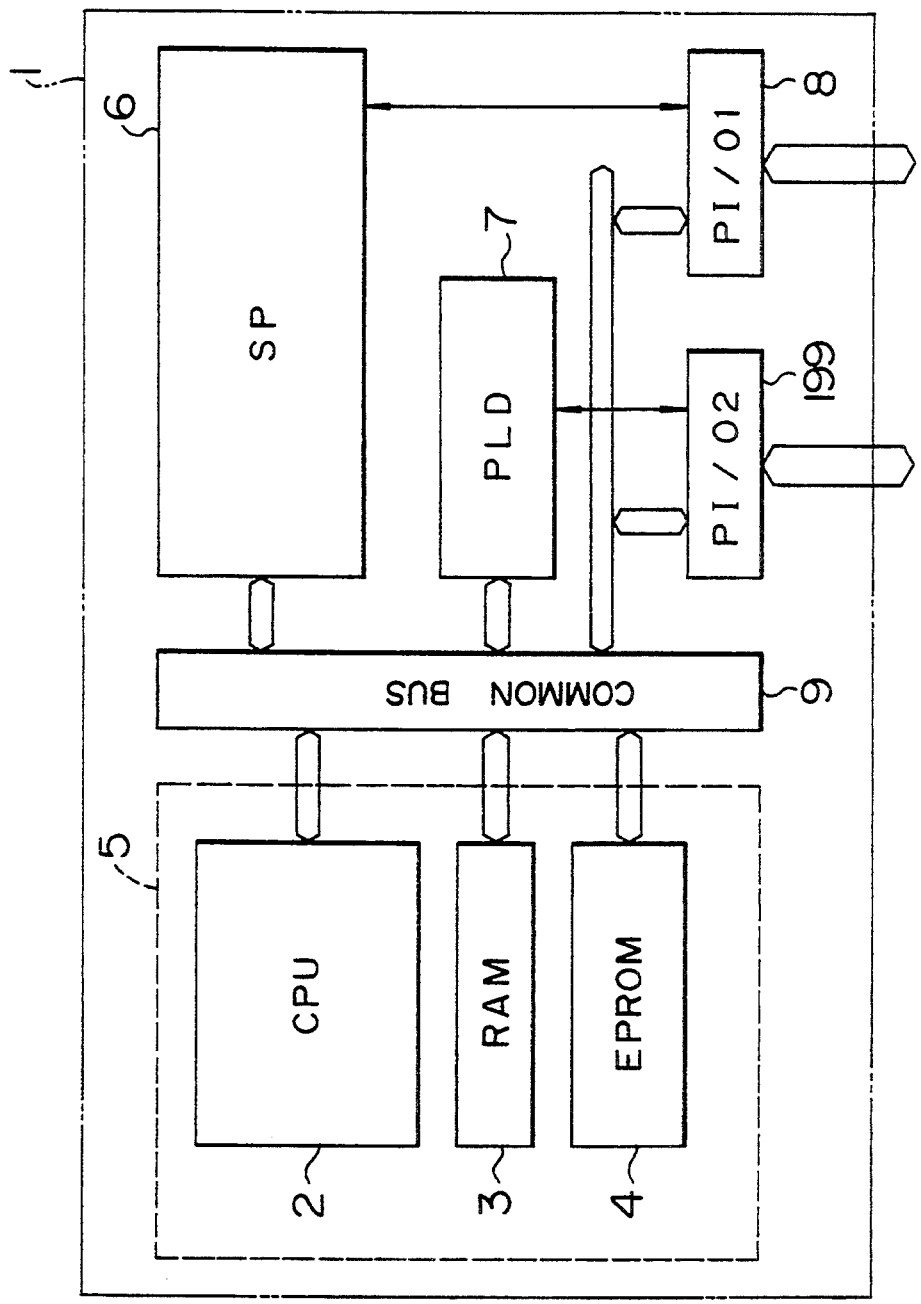
FIG. 2 is an overall configuration diagram of a single chip microcomputer which is an embodiment of the present invention.

FIG. 2 shows the overall configuration of a single chip microcomputer which forms an embodiment of the present invention.

A microcomputer 1 comprises on one semiconductor substrate:
- a main processor 5 including a CPU (central processing unit) 2, a RAM 3 and an EPROM (electrically writable read only memory) 4;
- a subprocessor (SP) 6;
- an electrically writable programmable logic device (PLD) 7;
- programmable I/O ports (PI/O) 8 and 199; and
- a common bus 9 for connecting the above described blocks together.

Among the above described components, the EPROM 4 is a memory for storing therein information regarding the operation of the CPU 2. It is possible to electrically write information from the outside of the chip into the EPROM 4.

Further, the above described subprocessor (SP) 6, programmable logic device (PLD) 7 and programmable I/O ports (PI/O) 8 and 199 are logic units respectively having therein non-volatile semiconductor memories into which information can be electrically written from outside the chip. Each of these logic units comprises a control circuit for prescribing connection relations of components included in the unit and for realizing a desired logic circuit configuration in response to information written into a non-volatile semiconductor memory included in the above described unit.

The above-described subprocessor (SP) 6 has therein a processor unit corresponding to the CPU 2 included in the main processor 5. In the present embodiment, the main processor 5 is used mainly for general calculation, whereas the subprocessor 6 is used mainly for functional processing, such as I/O control. From this point of view, the main processor 5 and the subprocessor 6 have different instruction sets corresponding to respective purposes of use.

Further, a DRAM or the like disposed outside the microcomputer 1 can also be connected to the microcomputer 1 as an external memory. In this case, a DRAM or the like is connected to the microcomputer 1 via an external memory I/O circuit (not illustrated) connected to the common bus 9 shown in FIG. 2. If the address space of this external memory is made common to the address space of the RAM 3 and the EPROM 4, it is possible to easily gain access to this external memory from the subprocessor 6, not to mention from the main processor 5.

The configuration and operation of the subprocessor 6 and the programmable I/O 8 will now be described by referring to FIG. 1. Main portions of the invention disclosed in the present application exist in this portion.

CONFIGURATION OF SUBPROCESSOR AND PROGRAMMABLE I/O

Figure 1:
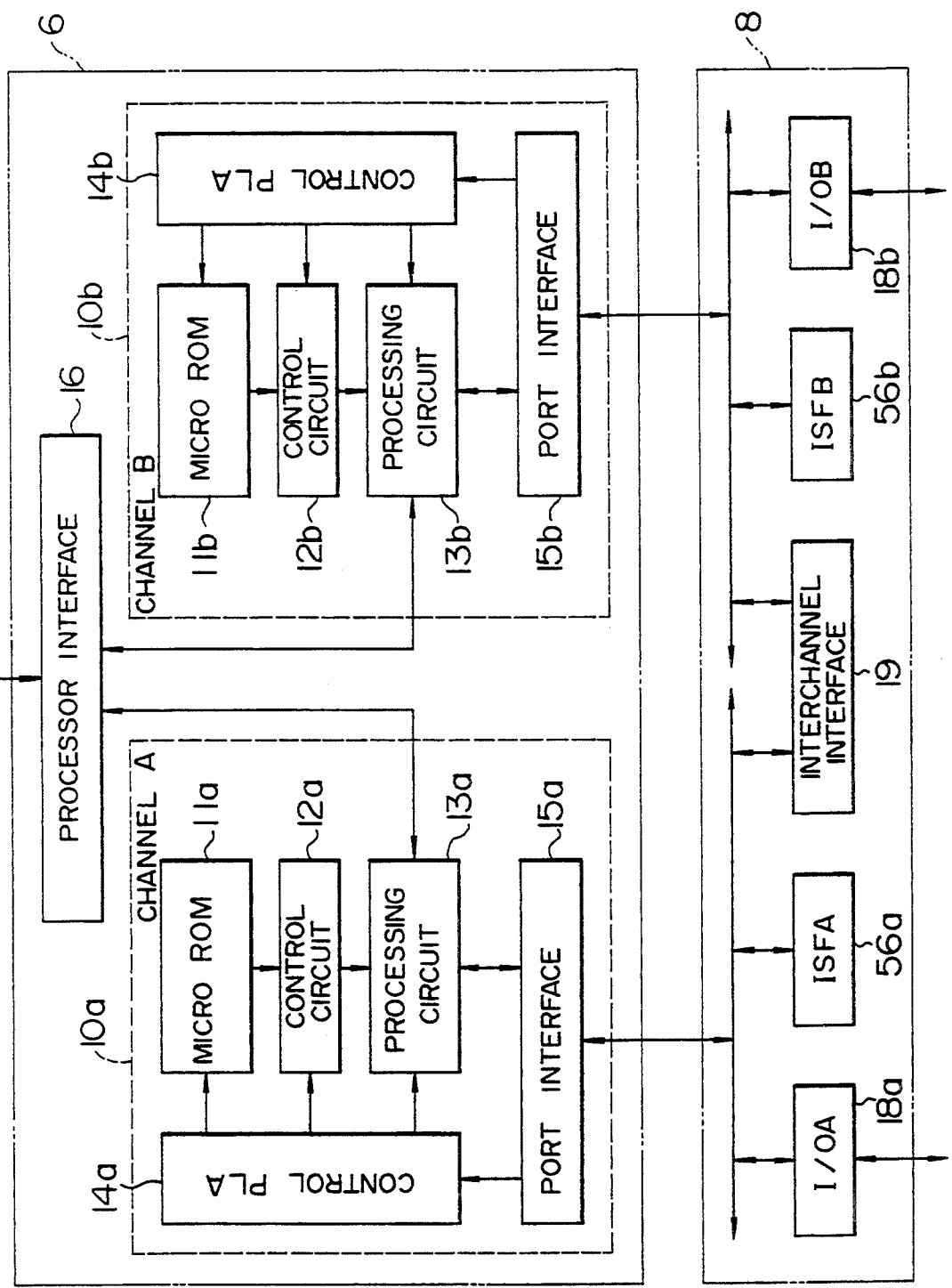
FIG. 1 is a block diagram of a subprocessor which is an embodiment of the present invention.

FIG. 1 is a diagram showing the configuration of the subprocessor 6 and the programmable I/O port (programmable I/O) 8 illustrated in FIG. 2. The subprocessor 6 comprises two processor channels (channel A 10a and channel B 10b) each having an identical configuration.

Each subprocessor channel comprises:
- a micro ROM (read only memory) 11 for storing therein microinstructions;
- a control circuit 12 for generating control information in accordance with information stored in the micro ROM 11;
- a processing circuit 13 controlled by the control circuit 12;
- a control PLA (programmable logic array) 14 for controlling the above described micro ROM 11, the control circuit 12 and the processing circuit 13; and a port interface circuit 15 coupled to the processing circuit 13 and the control PLA 14.

Further, the subprocessor 6 comprises a processor interface circuit 16 for communicating with the main processor 5. This interface circuit 16 is coupled to both the subprocessor channel A 10a and the subprocessor channel B 10b. The programmable I/O 8 has two channels corresponding to the above described subprocessor channels. Each channel comprises an I/O circuit (I/O) 18 associated with the port interface circuit 15 of the subprocessor 6 and comprises an interrupt status flag (ISF) 56.

Further, the programmable I/O 8 comprises an interchannel interface circuit 19. This interface circuit 19 is coupled to I/O A 18a, ISFA 56a, I/O B 18b and ISFB 56b.

Figure 3A:
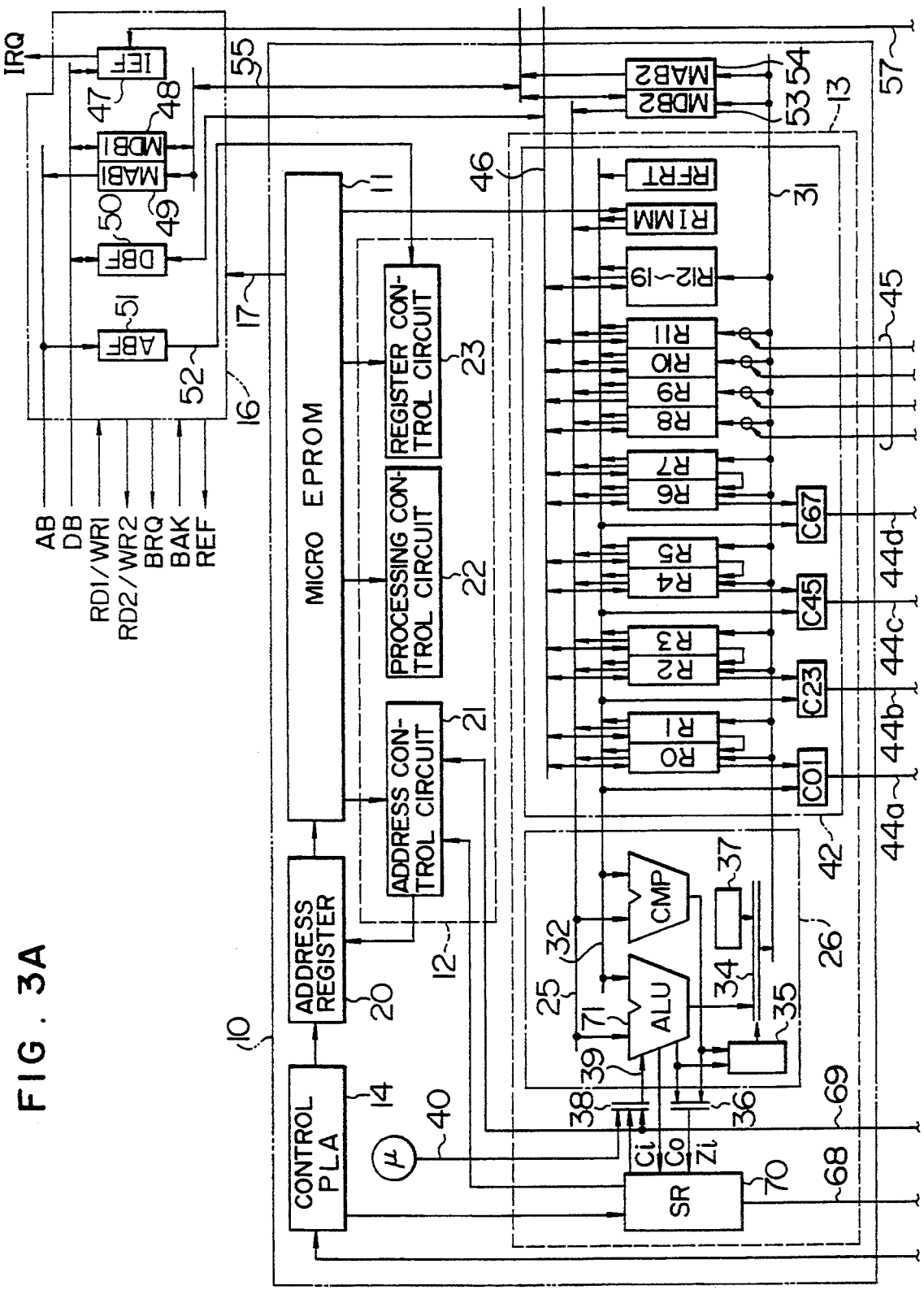

FIG. 3 shows a detailed configuration of the subprocessor and the programmable I/O per channel. Each of the micro ROMs shown in FIG. 1 comprises an EPROM (electrically writable read only memory), which is hereafter referred to as micro EPROM 11. Outputs of the micro EPROM 11 are inputted to the control circuit 12. In this micro EPROM 11, eight fields form one microinstruction word (i.e., one word). The eight fields are listed below.

(1) Instruction specifying field
(2) Data length specifying field
(3) Register selecting field
(4) Numerical data field
(5) Next address control field
(6) Port specifying field
(7) Output compare specifying field
(8) Input capture specifying field This microinstruction word will be described later in detail. Further, inputs to the micro EPROM 11 are supplied by an address register circuit 20. This address register circuit 20 is controlled by an address control circuit 21 included in the control circuit 12. This address control circuit 21 is a circuit for generating an address of the micro EPROM 11 on the basis of a status output supplied from a processing unit 26 and information supplied from the I/O circuit 18. The output of the address control circuit 21 is connected to the above described address register circuit 20. The address register circuit 20 is capable of storing a plurality of pieces of address information. Which of the plurality of addresses is selected depends upon the control PLA 14. In response to information stored beforehand in the micro EPROM 11, the processing control circuit 22 included in the control circuit 12 the connection relations of components included in the processing unit 26 in the processing circuit 13. Similarly, in response to information stored in the micro EPROM 11, a register control circuit 23 controls the connection relations of respective registers included in a register circuit 42 in the processing circuit 13.

The configuration of the processing circuit 13 controlled in operation by the control circuit 12 will now be described in detail.

The processing circuit 13 comprises the processing unit 26, a status register SR containing at least either one of a carry flag (CF) and a zero flag (ZF) or typically both of them, and the register circuit 42.

The processing unit 26 is provided to execute an instruction described in the instruction specifying field of the micro EPROM. The processing unit 13 comprises an arithmetic and logic unit (ALU) 71 and a comparator CMP.

The ALU 71 and the comparator CMP can operate simultaneously. Inputs of the ALU 71 and the comparator CMP are connected to a first read bus 25 and a second read bus 32. The output of the ALU is inputted to a write bus input selector 34. The output of the CMP is connected to a write bus output control circuit 35 and a zero flag input selector 36. A zero generation circuit 37 is connected to another input of the write bus input selector 34. The zero generation circuit 37 is a circuit used by an INCCLR (increment and clear) instruction which will be described later. The zero generation circuit 37 outputs "0" as data to a write bus 31 when the output of the CMP is "1". That is to say, the zero generation circuit 37 is used to clear a register specified as a counter register.

The ALU is connected to the status register SR via the zero flag input selector 36 and a carry input selector 38. Further, a carry input 39 to the ALU can be forcibly defined to be "0" or "1" by specifying information to be stored in a carry input specifying field included in the instruction specifying field of the micro EPROM 11 in addition to the carry flag contained in the above described status register SR. Further, a port data line 69 for transferring an input signal from a port in accordance with the specification of the above described field can also be used as the carry input 39 of the ALU.

The register circuit 42 comprises registers R0 to R19, RIMM and RFRT and-comparators C01, C23, C45 and C67 exclusively used for an output comparing function. The registers R0 to R19 are connected to the first read bus 25, the second read bus 32 and the write bus 31 in common. Read only registers RIMM and RFRT are connected to only the read buses. One of the inputs of the comparators C01, C23, C45 and C67 is connected to the registers R0, R2, R4 and R6, respectively. The other inputs of those comparators are connected to the second read bus 32 in common. Output lines 44a to 44d of the above described comparators are connected to the port interface circuit 15. This port interface circuit 15 is controlled by a signal on an output control line 43 generated on the basis of bits contained in the output compare specifying field of the micro EPROM. Further, the registers R8 to R11 have an input capture function. Inputs from the write bus 31 to these registers R8 to R11 are controlled by input capture input control lines 45 supplied from the port interface circuit 15. A read/write bus 46 for interfacing with the main processor 5 is connected to the registers R0 to R19 in common so that the main processor 5 shown in FIG. 2 may directly gain access to the registers R0 to R19. By arranging the registers R0 to R19 in the address space of the main CPU 2, it is possible to freely gain access to the registers R0 to R19 from the main CPU 2 as well. In this case, the main CPU 2 and the subprocessor 6 can simultaneously read the contents of an identical register. If simultaneous write attempts to an identical register occur, the write attempt from the main CPU 2 takes precedence and the write attempt from the subprocessor 6 becomes null. Data interchange with the main CPU 2 is performed via the processor interface circuit 16.

OPERATION OF MICROINSTRUCTION AND SUBPROCESSOR

Operation of the microinstruction, subprocessor and programmable I/O will now be described in detail. Here, each of the eight fields included in a microinstruction word and operation of the processor and the programmable I/O responsive to the description are successively described.

(1) Instruction specifying field

This field is a field for specifying the processing function of the processing unit 26 around the arithmetic and logic unit (ALU) 71 and operation of the status register (SR).

Instructions can be divided into ① general instructions, ② timer instructions and ③ memory access instructions. FIG. 4 is a list of instruction sets.

① General instructions

Transfer: MOVE

Arithmetic operation: ADD/Ci, SUB/Ci

Logic operation: AND, OR, ERO

Shift: LSL/Gi, LSR/Ci

No operation: NOP Ci denotes a carry input to the processing unit and can be specified as follows.

Ci=0
Ci=1
Ci=CF (carry flag of SR)
Ci=Pi (data of input port specified by (6) port specifying field described later)

② Timer instruction

INCCLR: Increment and clear. The contents of a first register and a second register included in the register circuit 42 are compared by the comparator CMP. If the contents of those registers are equivalent, a logic 1 is stored into the zero flag (ZF) of status register (SR) 70, and the first register is cleared. Unless the contents of those registers are equivalent, a logic 0 is stored into the ZF, and the data of the first register is increased by the ALU 71.

INCCMP: Increment and compare. The contents of the first register and the second register are compared by the comparator CMP. If the contents of those registers are equivalent, a logic 1 is stored into the ZF. Unless the contents of those registers are equivalent, a logic 0 is stored into the ZF. Further, in either case, data of the first register is increased by the ALU 71.

DECLD: Decrement and load. Data of the first register is decreased by the ALU 71. If the result is zero (i.e., (ZF)=0), data of the second register is transferred to the first register.

③ Memory access instruction

WRSET: Write set. A source register or numerical data is transferred to a data buffer.

WRSTART: Write start. A source register or numerical data is transferred to an address buffer, and a write cycle is started.

RDSTART: Read start. A source register or numerical data is transferred to the address buffer, and a read cycle is started.

RDGET: Read get. Contents of the data buffer are transferred to a destination register.

REF: Refresh. A source register or numerical data is transferred to the address buffer, and a refresh cycle is started.

In FIG. 4, B/W in data length column represents data length which can be handled by each instruction. The data length is specified by a field described below in (2).

(2) Data length specifying field

This is a field for specifying either 8 bits (byte or B) or 16 bits (word or W) as the data length processed in the processing unit 26 and the size of each register in the register circuit 42.

(3) Register selecting field

This is a field for simultaneously specifying two registers (a source register $R_s$ and a destination register $R_d$) involved in processing in the processing unit out of registers included in the register circuit 42. Whether the specified registers have bytes as a unit or words as a unit depends upon the specification of the field described above in (2). It is possible to specify a numerical register (RIMM) as the register. In this case, the numerical data described in the numerical data field which will be described later in (4) is involved in the processing. If a numerical register is specified as the destination register, the result of processing is reflected into only a status register, and result data is discarded.

FIG. 5 shows the configuration of registers incorporated in the register circuit 42. In FIG. 5, general purpose registers R0 to R19 can be used as 16 bit ×20 registers or 8 bit ×40 registers. Register RIMM (*5) is a register reflecting the numerical data described in the micro EPROM and is a read only register. Register RFRT (*6) is a register reflecting the value of a 16-bit free running timer supplied with clock signals as an input and is a read only register. R0/R1, R2/R3, R4/R5, and R6/R7 can also be used respectively in pairs as registers having an output compare function. In case an output compare specification is present in the output specifying field, which will be described later in (7), those registers are automatically selected in pairs.

Among the above described pairs, R0/R1 and R2/R3 are used exclusively for 16 bits, whereas R4/R5 and R6/R7 can be used for both 16 bits and 8 bits. Whether those registers are used for 16 bits or 8 bits is specified by the data length specifying field described above in (2). Registers R8 to R11 can be used as input capture registers as well. Whether the registers R8 to R11 are used as input capture registers or not is specified in the input capture specifying field, which will be described later in (8).

(4) Numerical data field

This is a field for describing numerical data in case a numerical register (RIMM) is specified in the register selecting field described above in (3).

(5) Next address control field

This is a field for describing which address is selected as the next microinstruction succeeding the microinstruction which is being executed. Into this field, a branch condition and two different addresses (address 0 and address 1) for allowing the destination of a branch to be changed on the basis of whether the condition is satisfied or not can be described.

As the branch condition, either one of a carry flag CF and a zero flag ZF contained in the status register SR, a carry C generated as a result of processing performed by an instruction in execution, zero Z and data Pi in an input port specified by a port specifying field described below in (6) can be specified. When the specified condition is satisfied, address 0 is selected as the next address. When the specified condition is not satisfied, address 1 is selected.

(6) Port specifying field

This is a field for specifying which bit among a plurality of bits stored in the programmable I/O 8 should be selected and how the I/O bit thus selected should be operated. Decoding of the information stored in this field and control of the above described selection and operation specification are performed by the port interface circuit 15. This I/O bit thus specified is hereafter referred to simply as a port.

In this field, three ports can be simultaneously specified. Three bits, i.e., three ports specified in this port specifying field are referred to as $P_0$, $P_1$ and $P_{ck}$.

① The following three operations can be specified in $P_0$.

A port is specified as neither an input nor an output.

A port is specified as an input. The specified port is used as an input port.

A port is specified as an output. The specified port is used as an output port. In this case, it is possible to specify what is used as the output condition and operations respectively performed when the output condition is satisfied and when the output condition is not satisfied.

Table 1 shows the kinds and contents of conditions which can be used as the above described output condition. Table 2 shows how operations "through", "0 output", "1 output" and "inversion" are performed on the basis of whether conditions of Table 1 are satisfied or not.

TABLE 1

| Output condition | Contents | |
|---|---|---|
| All | Unconditional | |
| Z | Processing result is zero | (=) |
| $\overline{Z}$ | Processing result is not zero | (≠) |
| C | Carry is present | (>) |
| $\overline{C}$ | Carry is not present | (≦) |
| Z + C | | (≧) |
| $\overline{Z + C}$ | | (<) |

TABLE 2

| Operation | Condition is satisfied | Condition is not satisfied |
|---|---|---|
| Through | 1 output | 0 output |
| 0 output | 0 output | No change |
| 1 output | 1 output | No change |
| Inversion | Inversion | No change |

② The following two operations can be specified in $P_1$.

Output is absent.

Output is present. In this case, the output condition (TABLE 3) and the operation at that time (TABLE 4) can be specified in the same way as the previous case of $P_0$. Unlike the case of $P_0$, the status of $P_0$ can be specified as the output condition.

TABLE 3

| Output condition | Contents | |
|---|---|---|
| All | Unconditional | |
| Z | Processing result is zero | (=) |
| $\overline{Z}$ | Processing result is not zero | (≠) |
| C | Carry is present | (>) |
| $\overline{C}$ | Carry is not present | (≦) |
| Z + C | | (≧) |
| $\overline{Z + C}$ | | (<) |
| $P_0$ | $P_0$ input is 1 | |
| $\overline{P_0}$ | $P_0$ input is 0 | |

TABLE 4

| Operation | Condition is satisfied | Condition is not satisfied |
|---|---|---|
| Through | 1 output | 0 output |
| 0 output | 0 output | No change |
| 1 output | 1 output | No change |
| Inversion | Inversion | No change |

③ The following two operations can be specified in $P_{ck}$.

Skip control is not present.

Skip control is present.

Skip control is a control for invalidating an instruction which is being executed. If a skip specification is present and the input to the specified port is 1, the instruction which is being executed is continued. If the input to the specified port is 0, however, the instruction which is being executed is invalidated. When the instruction is invalidated, the states of the register, the status register and the output port are not changed.

(7) Output compare specifying field

This is a field for specifying that the processing circuit 13 should perform an output compare operation. If the output compare operations is specified in this field, the registers R0 to R7 included in the register circuit 42 are ensured in pairs two by two, and a processing circuit configuration adapted to output compare is implemented.

Figure 6A:
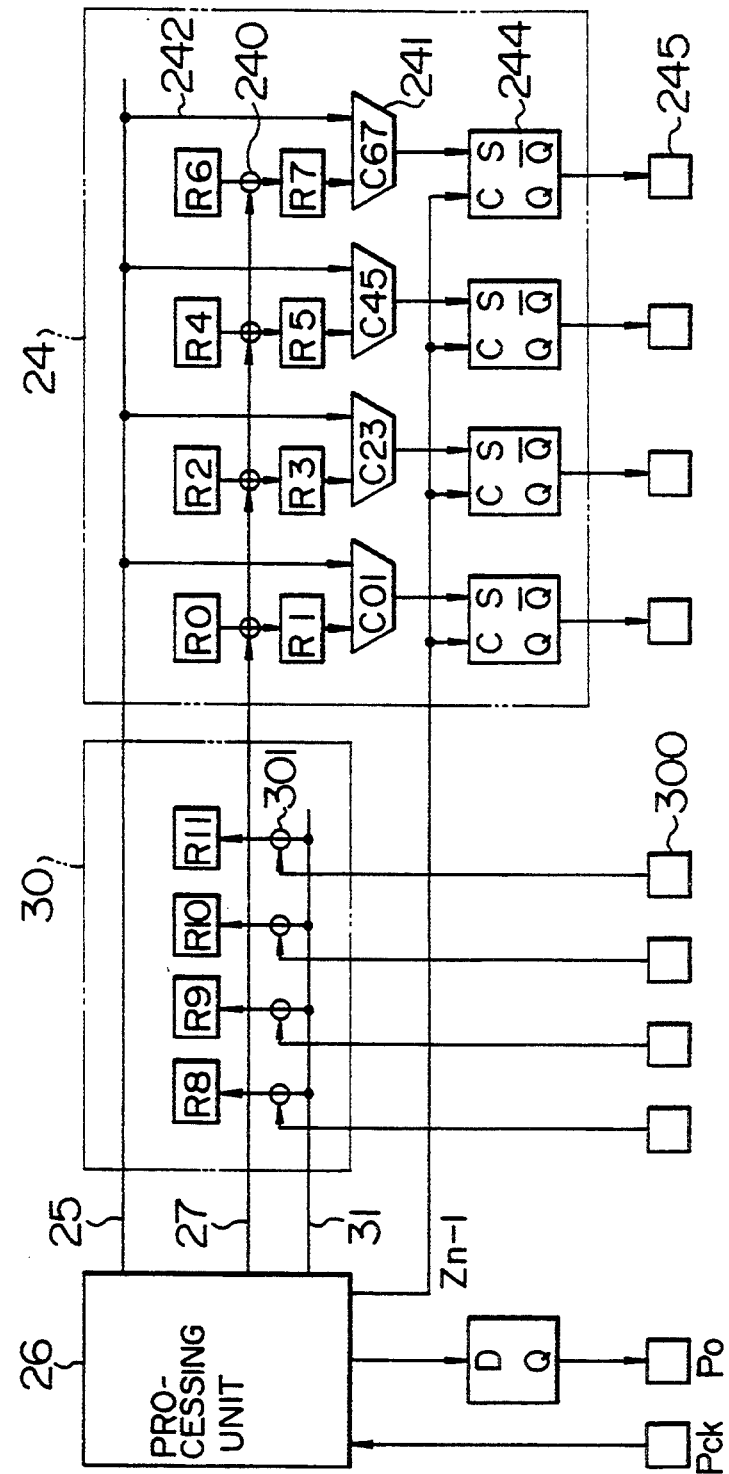
FIGS. 6a, 6B, 6C and 6D are diagrams showing connection of processing circuits used when timer function is to be implemented.

FIG. 6A is a diagram showing the configuration of the processing circuit 13 connected for an output compare operation. In FIG. 6a, numeral 24 denotes the register circuit 42 in which connection of registers and comparators is so controlled as to be suited for an output compare operation.

In the register circuit 24 of FIG. 6A, R0, R2, R4 and R6 denote base registers and R1, R3, R5 and R7 denote compare registers, whereas C01, C23, C45 and C67 denote comparators. As an example, the configuration and operation of a set of output compare circuits will now be described. The registers R6 and R7 are connected together via a gate circuit 240. One of the inputs of a comparator 241 is connected to the compare register R7, whereas the other input thereof is connected to the first read bus. An output 243 of the comparator 241 is connected to a set terminal S of an output flip-flop 244. The output of the flip-flop 244 is connected to an output compare output terminal 245.

The gate circuit 240 is controlled by a zero signal line 27 extending from the processing unit 26. If the zero signal line 27 becomes 1, data stored in the base register R6 is transferred to the compare register R7. Further, a clear terminal C of the output flip-flop 244 is connected to a zero flag line Zn−1 for representing zero flag information obtained before execution of the instruction. If the instruction is executed under the state that the Zn−1 is 1, the above described flip-flop 244 is cleared. The function of the processing unit complies with an instruction described in the instruction field of the micro EPROM.

Figure 6B:
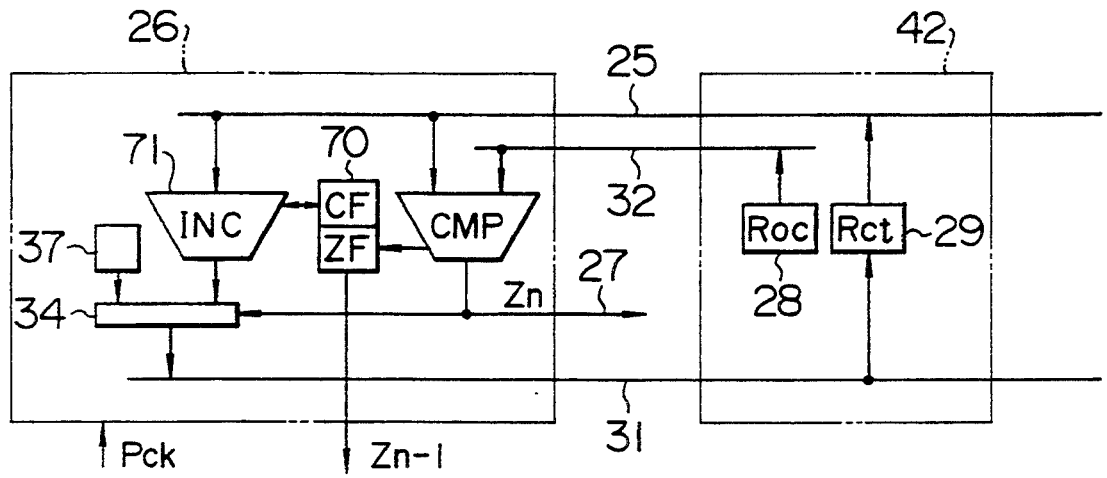
Figure 6C:
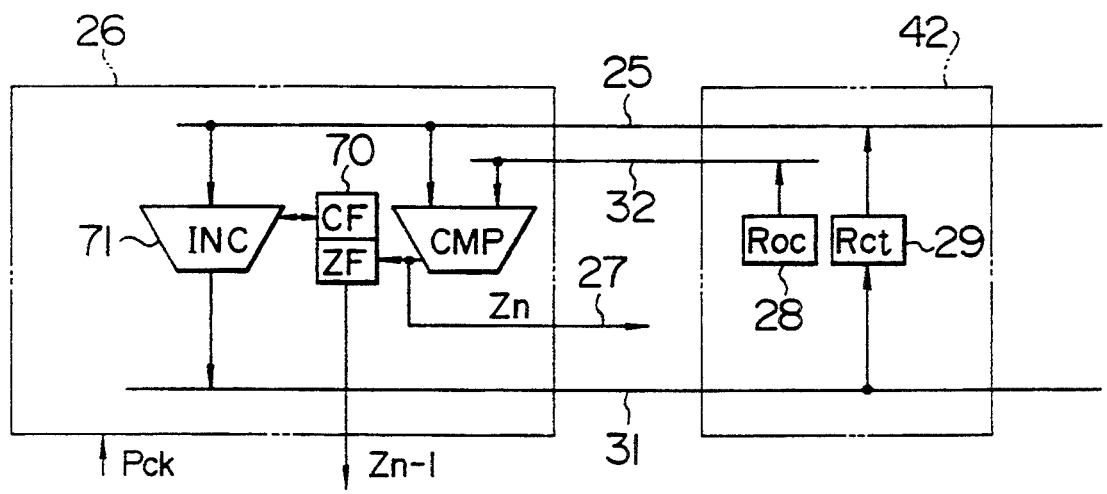
Figure 6D:
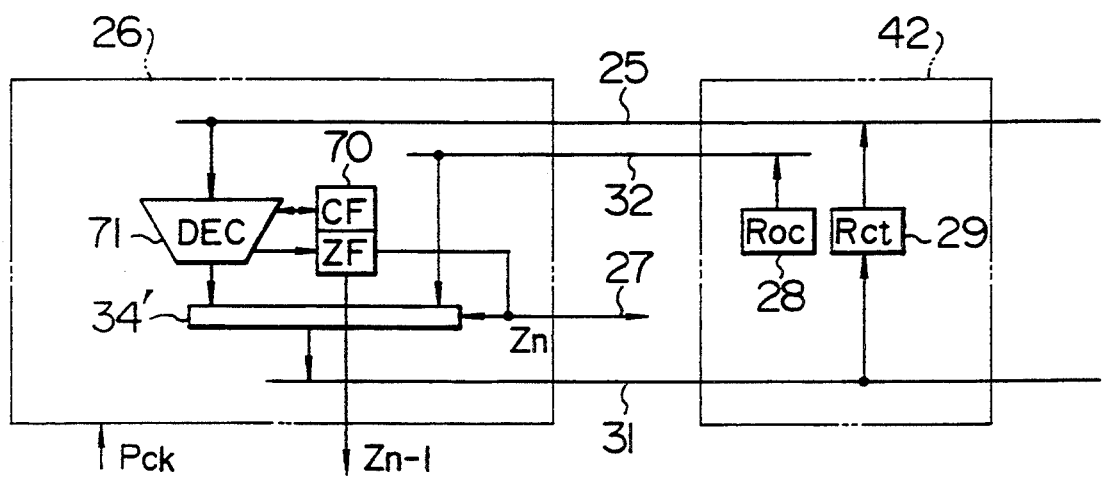

FIGS. 6B to 6D show configurations of the processing unit 26 and the register circuit 42 used when a timer instruction is executed. The timer instruction was mentioned before in the term of "(1) Instruction specifying field" as well by referring to the list of FIG. 4. Circuit configurations implemented in the processing unit 26 and the register circuit 42 will now be described by referring to FIGS. 6B to 6D.

FIG. 6B shows a configuration implemented when the INCCLR instruction shown in FIG. 4 has been executed. The ALU 71 connected to the first read bus 25 becomes an incrementer (INC). Further, inputs of the comparator CMP included in the processing unit 26 are connected to the first read bus 25 and the second read bus 32. At this time, two registers specified in the register specifying field are specified as a counter register $R_{ct}$ 29 and a constant register $R_{oc}$ 28.

In the same way, FIG. 6C shows the case of the INCCMP instruction and FIG. 6D shows the case of the DECLD instruction. However, FIG. 6C and FIG. 6D will not be described further.

(8) Input capture specifying field

This is a field for specifying that the processing circuit 13 should perform an input capture operation. If input capture is specified in this field, the registers R8 to R11 included in the register circuit 42 are specified as the input capture registers as described before in (3) and a processing circuit configuration suited for input capture is implemented.

FIG. 6A is also a diagram showing the configuration of the processing circuit 13 connected so as to be suited for input capture. In FIG. 6a, numeral 30 denotes the register circuit 42 at the time when the connection of the registers is so controlled as to be suited for input capture. Up to four input captures can be specified at the maximum. If this instruction is executed, input gates 301 are opened at write timing to registers when input capture input terminals 300 are logic 1. Contents on the write bus 31 are taken into the input capture registers R8 to R11.

INTERFACE BETWEEN MAIN PROCESSOR AND SUBPROCESSOR

The interchange of data between the CPU 2 in the main processor 5 and the subprocessor 6 is performed via the processor interface circuit 16 mounted in the subprocessor 6. As shown in FIG. 3, the processor interface circuit 16 comprises an interrupt enable flag (IEF) register 47, a first memory data (MDB1) register 48, a first memory address buffer (MAB1) register 49, a data buffer (DBF) register 50 and an address buffer (ABF) register 51. The processor interface circuit 16 is controlled by a control line 17 coming from the micro EPROM.

As interface modes to the main processor 5 shown in FIG. 2, there are three modes, i.e., (1) slave mode, (2) master mode, and (3) interrupt request. These three modes will now be described in detail.

(1) Slave mode

In this mode, the main processor 5 operates as the master. Data transfer between the main processor and the subprocessor is executed in this mode via an address bus (AB) and a data bus (DB) connected to the processor interface circuit 16 of FIG. 3. To be more specific, data transfer between the CPU 2 and the registers R0 to R19 included in the subprocessor 6 is performed in accordance with a read/write signal (RD1/WR1) generated in the CPU 2 and the signal on the address bus (AB).

When data is to be written into the registers R0 to R19, write data is outputted from the CPU 2 onto the data bus DB, and an address corresponding to a register number is outputted onto an address bus AB. And, a write signal (WR1) is asserted. As a result, write data is taken into the data buffer (DBF) 50, and register selection information is taken into the address buffer (ABF) 51. In synchronism with the operation of the subprocessor channel 10, data is transferred from the above described data buffer 50 into a selected register.

(2) Master mode

In this mode, the subprocessor 6 operates as the bus master. Under the state that the subprocessor 6 issues a bus right request to the CPU 2 of the main processor 5 and the subprocessor 6 dominates the common bus 9, read/write of data from/to the RAM 3 included in the main processor 5, readout of data from the EPROM 4, and input/output of data to/from the programmable I/O 8 are executed.

As for the bus right request to the CPU 2, a bus right request signal BRQ is outputted from the processor interface circuit 16, and an acknowledge signal BAK is outputted from the CPU 2 in response to the signal BRQ. The right to use the bus can be used under the control of the subprocessor 6.

Figure 7:
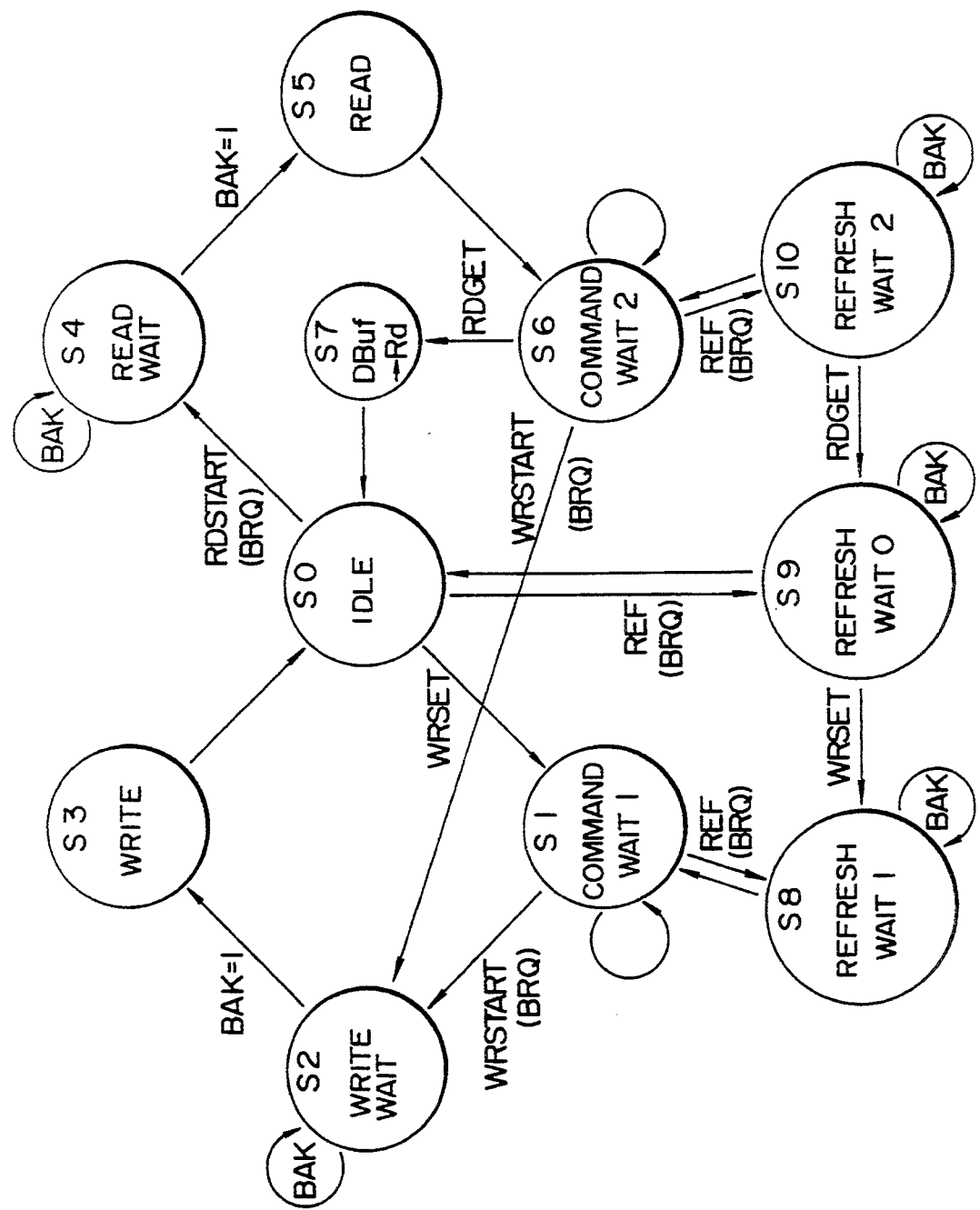
FIG. 7 is a status transition diagram of a memory access circuit.

The bus right request signal BRQ supplied from the subprocessor is generated by executing the WRSTART instruction, RDSTART instruction and the REF instruction included in the memory access instructions described with reference to FIG. 4. Data access in this mode will hereafter be described in detail by referring to FIG. 3 and a status transition diagram of a memory access control circuit shown in FIG. 7.

In an idle state (S0), only the WRSET instruction, RDSTART instruction and REF instruction among the memory access instructions shown in FIG. 4 are accepted, and transition to other states becomes possible. If the WRSET instruction is executed, data of the specified register Rd or numerical data is transferred to a second memory data buffer (MDB2) 53 of the subprocessor 6 via the first read bus 25, the ALU 71 and the write bus 31, and is further transferred to the first memory data buffer (MDB1) 48 of the processor interface circuit 16 via a memory access bus 55. The state is then shifted to "Command wait 1" (S1).

In the state S1, only the WRSTART instruction and the REF instruction are accepted. If the WRSTART instruction is executed under this state, data of a register Ra in which a memory address is stored or numerical data is transferred to a second memory address buffer (MAB2) via the first read bus 25, the ALU 71 and the write bus 31, and is further transferred to the first memory address buffer (MAB1) 49 via the memory access bus 55. At this time, the bus right request signal BRQ is outputted from the processor interface circuit 16, and the state is shifted to "Write wait" (S2).

Under this state, the bus acknowledge signal BAK which is an answer signal returned from the main CPU is awaited. If the acknowledge signal BAK is asserted, the state is shifted to "Write" (S3).

In the "Write" state (S3), contents of the first memory data buffer (MDB1) are outputted onto the data bus DB, and contents of the first memory address buffer (MAB1) 49 are outputted onto the address bus AB. In addition, a write signal (WR2) is outputted. After writing has been finished, the idle state (S0) is restored.

If the RDSTART instruction is executed in the idle state (S0), data of a register, in which a memory address to be read out is stored, is transferred to the first memory address buffer 49 via the second memory address buffer 54. In addition, the bus right request signal BRQ is outputted, and the state is shifted to "Read wait" (S4).

If the acknowledge signal BAK is present in this state, the contents of the first memory address buffer 49 are outputted onto the address bus AB, and a read signal (RD2) is outputted. Data is read out into the first memory data buffer 48 via the data bus (S5). The state is then shifted to "Command wait 2" (S6).

In the "Command wait 2" state (S6), the RDGET instruction, WRSTART instruction and REF instruction are accepted. The RDGET instruction is an instruction for transferring data from the first memory data buffer 48 to a specified register. As described before, the WRSTART instruction is an instruction for writing data from the second memory data buffer 53 into a specified memory address in a memory included in the main processor or a memory disposed outside the chip. If the RDSTART instruction and the RDGET instruction are executed in succession, therefore, the contents of the memory are taken into the register of the subprocessor 6. If the RDSTART instruction and the WRSTART instruction are executed in succession, data is directly transferred from a memory to another memory via the first memory data buffer (MD1) 48.

Execution of the REF instruction is possible only in the idle state (S0), command wait 1 state (S1) and command wait 2 state (S6). In respective cases, the bus right request signal BRQ is outputted, and the state is shifted to "Refresh wait 0 to 2" (S8 to S10).

If the acknowledge signal BAK is asserted in the refresh wait state, a signal required to refresh a dynamic RAM is outputted to the outside of the semiconductor integrated circuit, the state assumed before shifting to the refresh wait 0 to 2 states (S8 to S10) is restored. If the WRSET instruction is executed in the refresh wait 0 (S9), however, the state is shifted to the refresh wait 1 state (S8). After the refresh has been finished, the state is shifted to the command wait 1 state (S1).

Further, if the RDGET instruction is executed in the refresh wait 2 state (S10), the state is shifted to "refresh wait 0" (S9). After the refresh has been finished, the idle state is restored.

If execution of a memory access instruction heretofore described is, successful and a shift to the next state has been performed, the zero flag ZF within the status register SR 70 as shown in FIG. 3 is set ("1"). If a shift to the next state could not be performed, the zero flag ZF is cleared ("0"). By producing a program in which the zero flag ZF after execution of the instruction is confirmed and the same instruction is executed repetitively until the relation ZF=1 is satisfied, a reliable memory access can be performed.

(3) Interrupt request

This is a mode for generating an interrupt request to be supplied from the subprocessor 6 to the main processor 5. An interrupt status flag (ISF) 56 shown in FIG. 3 comprises an 8-bit flag, and it can be set or cleared by an instruction of the subprocessor 6. That is to say, the interrupt status flag 56 can be specified in the port specifying field of a microinstruction and can be manipulated by the same handling as that of the I/O port. The output of the interrupt status flag 56 is connected to the interrupt enable flag (IEF) 47 disposed within the main processor interface circuit 16 via wiring 57. Respective bits of this interrupt enable flag (IEF) 47 correspond to respective bits of the interrupt status flag 56.

In case the bit of the interrupt status flag (ISF) 56 is set and the interrupt enable flag (IEF) 47 is set, an interrupt request IRQ to the CPU 2 is generated. The interrupt enable flag 47 is connected to the data bus DB, and its write and read operation can be performed from the main processor 5.

INTERFACE BETWEEN SUBPROCESSORS AND BETWEEN PORT AND SUBPROCESSOR

The interface between the main processor 5 and the subprocessor 6 has heretofore been described. As described with reference to FIG. 1, the present subprocessor 6 comprises the subprocessor channel A 10a and the subprocessor channel B 10b having the same configuration. In order to perform communication between these subprocessor channels, the interchannel interface circuit 19 is provided. The interchannel interface circuit 19 comprises an 8-bit semaphore flag (S) and is connected to both the subprocessor channel A 10a and the subprocessor channel B 10b. Therefore, respective channels can gain access to the semaphore flag (S) in common. Selection and manipulation of the semaphore flag is specified by the port specifying field of the microinstruction. The semaphore flag (S) can be set and cleared by the write manipulation and it is a flag with readout clear.

The port interface circuit 15 of FIG. 3 is an interface circuit between the subprocessor channel 10 and the interchannel interface circuit 19 comprising the I/O circuit (I/O) 18, the interrupt status flag (ISF) 56 and the semaphore flag (S). The I/O circuit 18 comprises a 16-bit I/O port and can communicate with the outside of the semiconductor integrated circuit via a terminal 67. All of the above described I/O port 18, the interrupt status flag 56 and the semaphore flag 19 are handled as ports taking one bit as a unit. By specification in the above described port specifying field of the micro EPROM 11, three ports can be simultaneously selected as the I/O port ($P_0$), output port ($P_1$) and input port ($P_{ck}$) to perform read/write operation.

The port interface circuit 15 is connected to the status register (SR) 70 via a status register output line 68 and supplied with information of the carry flag (CF) and zero flag (ZF) stored in the status register 70. The port data line 69 is inputted to the arithmetic and logic unit (ARU) 71 and the address control circuit 21 via the carry input selector 38. In the address control circuit 21, a signal on the port data line 69 is used as one of the branch conditions. The port interface circuit 15 is coupled to the above described ports by a $P_0$ signal line 59, a $P_1$ signal line 58, a $P_{ck}$ signal line 60, a $P_0$ selection line 62, a $P_1$ selection line 61 and a $P_{ck}$ selection line 63. It is possible to specify an I/O to a port selected by the $P_0$ selection line 62 and perform data output to the port and data input from the port via the $P_0$ signal line 59. It is possible to specify only an output to a port selected by the $P_1$ selection line 61, and data is , outputted to the port via the $P_1$ signal line 58. It is possible to specify only an input to a port selected by the $P_{ck}$ selection line 63, and data from the port is inputted via the $P_{ck}$ signal line 60. This $P_{ck}$ signal is used for skip control of an instruction. In addition to port functions specified by the $P_0$ selection line 62, $P_1$ selection line 61 and $P_{ck}$ selection line 63 heretofore described, there are the output compare function and the input capture function. However, they function as described before.

ADDRESS REGISTER AND STATUS REGISTER

The address register circuit 20 of the subprocessor channel 10 shown in the present embodiment comprises 8 address registers having an identical configuration. Address information of the micro EPROM 11 is stored in each address register. Further, the status register circuit (SR) 70 also comprises 8 status registers having an identical configuration.

Figure 8:
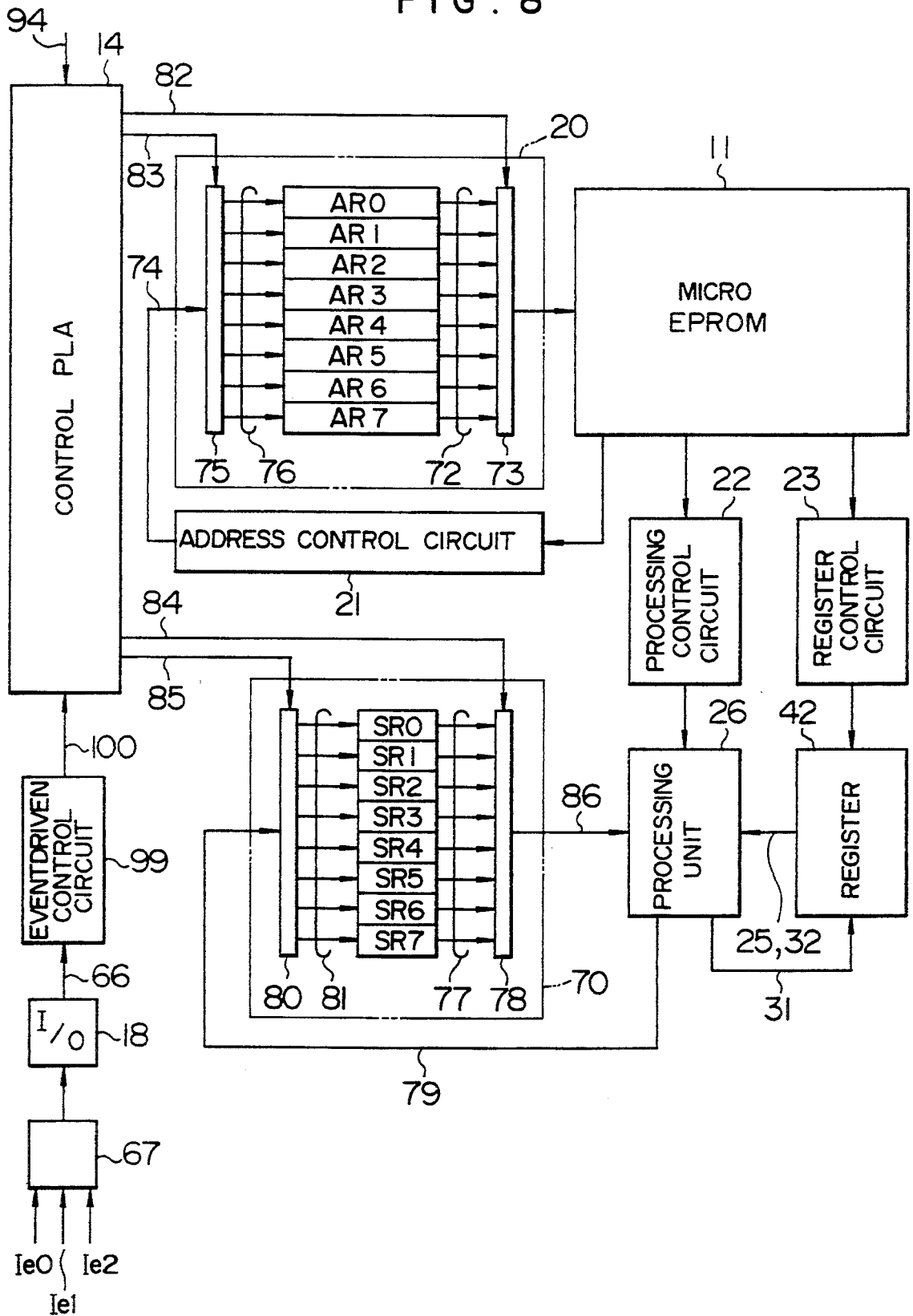
FIG. 8 is a configuration diagram showing an address register, a status register and associated components.

FIG. 8 shows an example of a configuration of the address register circuit 20, the status register circuit (SR) 70 and their peripheral circuit. The address register circuit 20 comprises address registers AR0 to AR7, an address register output selector 73 for selecting one of respective output lines 72, an address register input multiplexer 75 connected to an output line 74 of the address control circuit 21, and address register input lines 76 for transferring the output of the address register input multiplexer 75 to the address registers AR0 to AR7. Further, the status register circuit 70 comprises status registers SR0 to SR7, a status register output selector 78 for selecting one of respective output lines 77, a status register input multiplexer 80 having as its input line a status signal line 70 outputted from the processing unit 26, and status register input lines 81 for transferring the output of the status register input multiplexer 80 to any one of the status registers SR0 to SR7.

Control signals of the above described address register output selector 73, the address register input multiplexer 75, the status register output selector 78 and the status register input multiplexer 80 are generated in the control PLA 14, and are used to control respective units via an address register output control line 82, an address register input control line 83, a status register output control line 84 and a status register input control line 85. Assuming that an address register ARi is selected out of eight address registers AR and a status register SRi is selected out of eight status registers SR, a series of operations will now be described.

①  Selection information of ARi is outputted from the control PLA 14 onto the address register output control line 82. Data of the micro EPROM 11 is read out by using contents of the ARi as the address, and that data is transferred to the address control circuit 21, the processing control circuit 22 and the register control circuit 23.

②  The address control circuit 21, the processing control circuit 22 and the register control circuit 23 decode data respectively relating to address control, processing control and register control included in data of the micro EPROM. As a result, generation of control signals required for processing control of the processing unit 26 and selection of a register are performed.

③  The contents of a source register are read out. Selection information of the SRi is outputted from the control PLA 14 onto the status register output control line 84. By using the carry flag and/or the zero flag contained in the SRi, processing is executed.

④  Selection signals SRi and ARi are outputted from the control PLA 14 onto the status register input control line 85 and the address register input control line 83, respectively. The result of processing is written into the destination register. New status register data generated as a result of processing is taken into the SRi, and the next address is taken into the ARi. The series of operations is thus finished.

In the above described series of operations ① to ④, selection of the address register ARi and the status register SRi is performed by the control PLA 14. By constructing the control PLA so that the pair of an address register and a status register may be successively changed and executed, therefore, up to 8 independent programs of the micro EPROM can be executed. The control PLA 14 is controlled by a reset signal line 94 and an event control line 100 connected to an event driven control circuit 99. These control lines will be described later.

As a first example of control performed by the control PLA 14, it is now assumed that pairs of address registers and status registers and orders of selection and of these pairs are prescribed as follows.

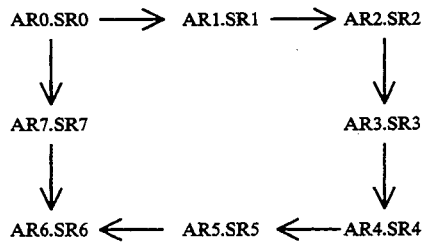

In case of this example, one cycle is executed in a time required for executing the above described series of operations ① to ④, i.e., in a time equivalent to 8 times the microinstruction execution time. The same pair of an address register and a status register is restored.

Figure 9A:
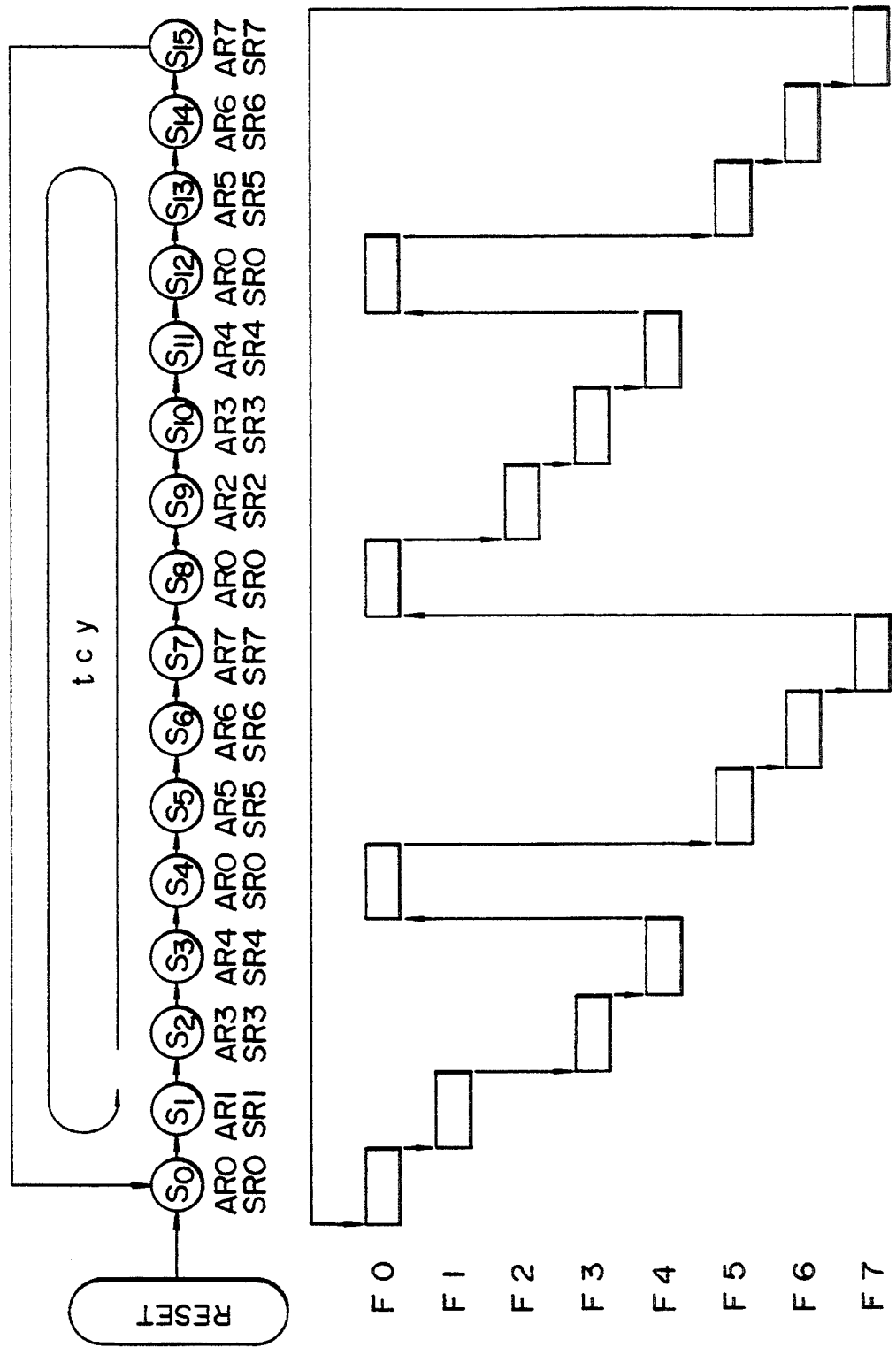
FIGS. 9A and 9B are diagrams showing operation sequences in the configuration of FIG. 8.

FIG. 9A shows a second example of control performed by the control PLA 14. In this example, the above described series of operations is represented by a state Si. One cycle comprises 16 states, i.e., $S_0$ to $S_{15}$. In each state, the illustrated pair of an address register and a status register is selected and executed. In FIG. 9A, F0 to F7 represent functions executed by using AR0·SR0 to AR7·SR7, respectively. Each function is implemented by a combination of instructions shown in FIG. 4, i.e., a program. In case of the example shown in FIG. 9A, the function F0 is executed four times in a cycle time tcy. That is to say, 4 microinstructions are executed in the cycle time tcy. Each of the functions F1 and F2 is executed once in the cycle time tcy. Each of the functions F3, F4, F5, F6 and F7 is executed twice. Therefore, the execution cycle of each function can be represented as follows.

F0: tcy/4
F1, F2: tcy
F3 to F7: tcy/2

The second control example of the control PLA has heretofore been described. By changing data of the control PLA, however, an arbitrary combination can be implemented. It is also possible to implement a low-speed function, a medium-speed function and a high-speed function mixedly. Further, by using a control PLA comprised of electrically writable EPROM devices, it becomes possible to freely reconstruct the control PLA in the user field in the same way as the micro EPROM.

Figure 9B:
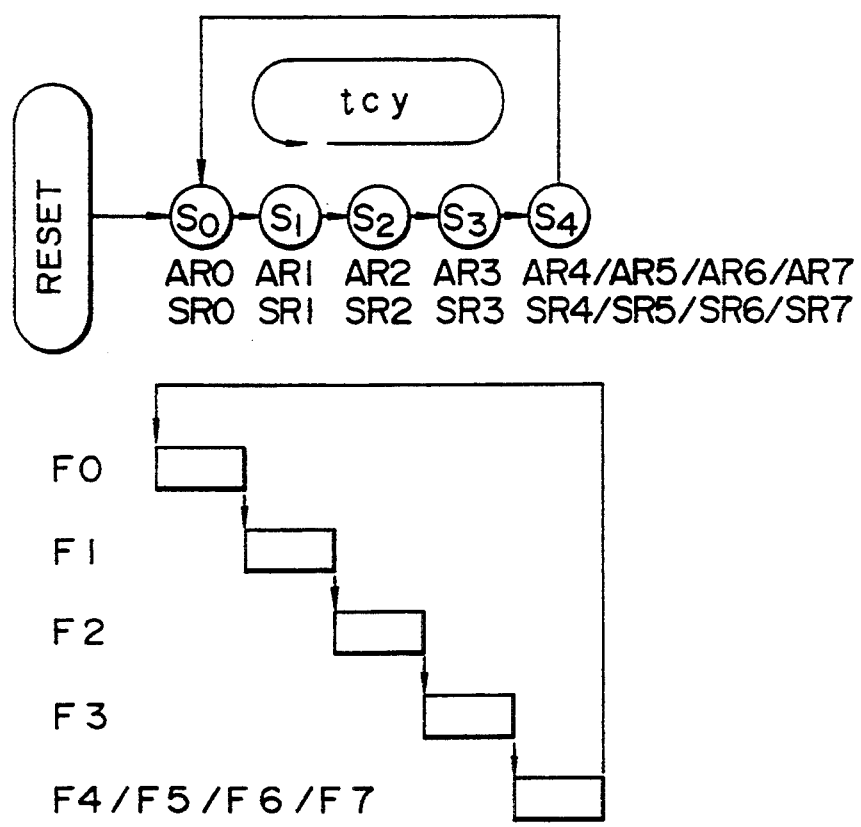

FIG. 9B shows a third example of control performed by the control PLA. In this example, one cycle comprises 5 states $S_0$ to $S_4$. An event driven function is assigned to the state $S_4$. The term "event driven" means that three terminals (Ie 0, Ie 1, Ie 2) included in the terminal 67 as shown in FIG. 8 are used as event input terminals having priority orders and the control PLA is controlled via the I/O circuit 18, an event driven input line 66, the event driven control circuit 99 included in the port interface circuit 15, and the event control line 100. Thereby, functions corresponding to the input terminals Ie 0, Ie 1 and Ie 2, i.e., pairs of address registers and status registers are selected. In the example of FIG. 9B, F4 (AR4·SR4), F5 (AR5·SR5), F6 (AR6·SR6) and F7 (AR7·SR7) are assigned as the event driven function. Assuming now that priority orders of inputs from the input terminals Ie 0, Ie 1 and Ie 2 are prescribed as Ie 0>Ie 1>Ie 2 (i.e., the input from the Ie 0 has the highest priority), functions F4 to F7 can be selected as shown in TABLE 5.

TABLE 5

| Ie 0 | Ie 1 | Ie 2 | Function |
|------|------|------|----------|
| 0    | 0    | 0    | F4       |
| 0    | 0    | 1    | F5       |
| 0    | 1    | x    | F6       |
| 1    | x    | x    | F7       |

In this table, mark x means "don't care", i.e., the input represented by mark x is disregarded.

Figure 10:
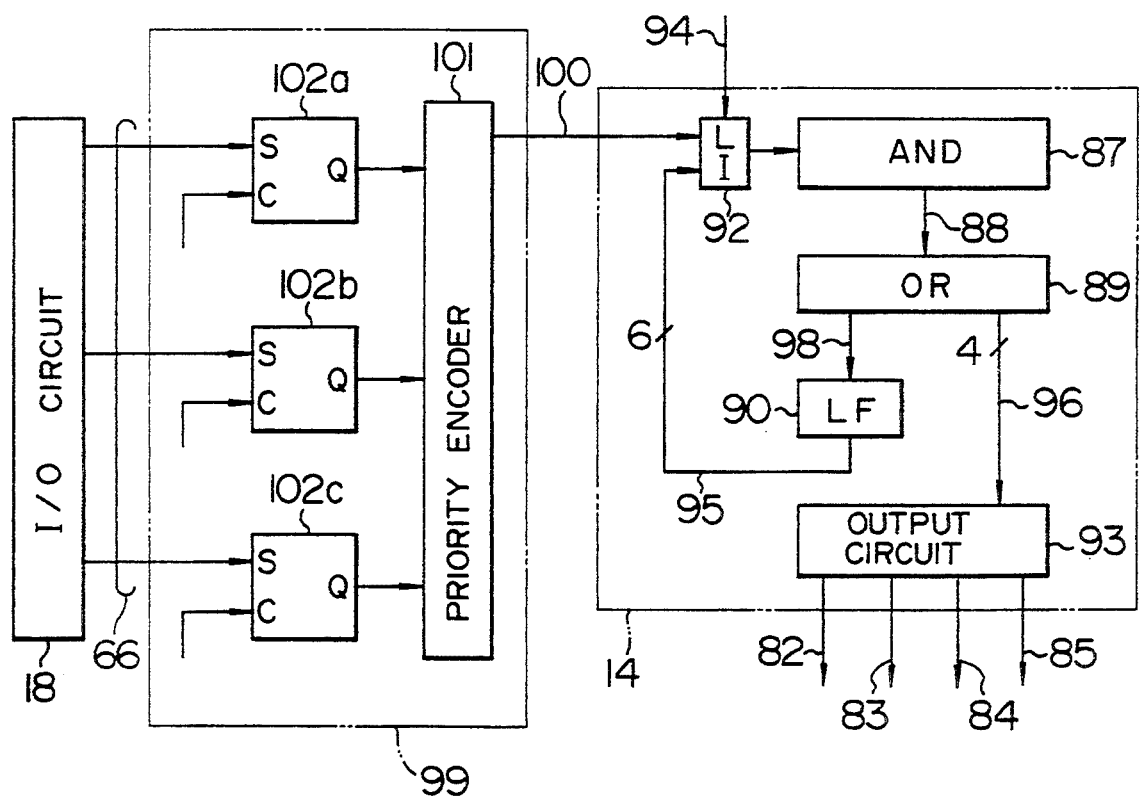
FIG. 10 is a diagram showing the configuration of a control PLA and an event driven control circuit.

FIG. 10 shows an example of the configuration of the control PLA 14 and the event driven control circuit 99 shown in FIG. 8. This control PLA 14 comprises a logic array structure (AND plane, OR plane). To be more specific, the control PLA 14 comprises an AND (logical product) plane 87, an output line (product term line) 88 of the AND plane 87, an OR (logical sum) plane 89, a feedback latch (LF) 90 connected to the output of the OR plane 89 via a feedback latch input line 98, an input latch (LI) 92 connected to the feedback latch 90 via a feedback line 95, and an output circuit 93 connected to the OR plane 89. The AND plane 87 and the OR plane 89 of the PLA comprise electrically writable non-volatile semiconductor memory devices. Contents can be written from the outside of the microcomputer chip into the AND plane 87 and the OR plane 89.

Outputs of the output circuit 93 are the address register output control line 82, the address register input control line 83, the status register output control line 84 and the status register input control line 85. Inputs of the input latch 92 are connected to a reset signal line 94 for supplying an initializing signal and an event control line 100 coming from a priority encoder 101 included in the event driven control circuit 99.

The event driven control circuit 99 comprises event latches 102a, 102b and 102c connected to the above described priority encoder 101 and the I/O circuit 18. Set terminals of the event latches 102a, 102b and 102c are connected to the I/O circuit 18 via event driven input lines 66. Each of the event latches 102a, 102b and 102c has a clear terminal C so that the latch may be cleared by an instruction of the subprocessor 6.

In the present configuration example, the feedback line 95 comprises six lines, and up to 64 (=$2^6$) states at the maximum can be programmed. A control output line 96 from the OR plane 89 comprises 4 lines and transfers pair selection information of address registers AR0 to AR7 and status registers S0 to S7 relating to function to be executed to the output circuit 93. On the basis of this information, the output circuit 93 performs timing control required for a series of control operations.

FIGS. 11A and 11B show PLA data respectively corresponding to the PLA control examples described by referring to FIGS. 9A and 9B, respectively. In FIGS. 11A and 11B, "Ev" represents contents of an event input, "FB" state information inputted to the AND plane 87 via the feedback line 95, "next state" next state information outputted from the OR plane 89 onto the feedback latch input line 98, and "control" function executed as a result of control performed by the control PLA 14.

The operation of the control PLA 14 in the examples of FIGS. 9A and 9B will now be described by referring to FIGS. 10, 11A and 11B.

In the example of FIG. 9A, the event function is not defined. As shown in FIG. 11A, therefore, the event input Ev is marked with x ("don't care") in all states (S0 to S15).

When the output of the input latch 92 contains information of $S_j$ (j=0 to 63), i.e., when the state executed at the AND plane 87 is $S_j$, information $S_{j+1}$ of the next state is outputted onto the feedback latch input line 98. Further, a selection signal of the ARi·SRi pair (Fi) relating to the function executed at the state $S_j$ is outputted onto the control output latch input line 100.

With reference to FIG. 9A, S0 is inputted to the AND plane 87 while the reset signal 94 is being inputted. When the reset is cancelled, the operation is started from this state S0. That is to say, S1 is outputted from the OR plane 89 onto the input line 98 as the next state, and latched in the feedback latch 90. As the control output, F0 is outputted. When a series of processing relating to F0 has been finished, the next state information S1 is transferred from the feedback latch 90 to the input latch 92 to become input information of the AND plane 87. The operation heretofore described is repeated. If S0 is defined as the next state information when the input information to the AND plane is S15, operation is repetitively executed in the loop as shown in FIG. 9A.

In the example of FIG. 9B, an event function is assigned to state S4. At the state S4 succeeding the execution of the S3 state, a function is selected and executed depending upon the state of the event input Ev. That is to say, functions F4, F5, F6 and F7 are selected and executed respectively when Ev=Ev 3, Ev=Ev 2, Ev=Ev 1 and Ev=Ev 0. That is to say, the S4 state is described as four states comprising Ev3·S4, Ev2·S4, Ev1·S4 and Ev0·S4, where "·" represents a logical product.

If S0 is described as the next state succeeding the above described four states, the processing returns to the S0 state after the event function has been executed. The loop operation is thus repeated.

Figure 12A:
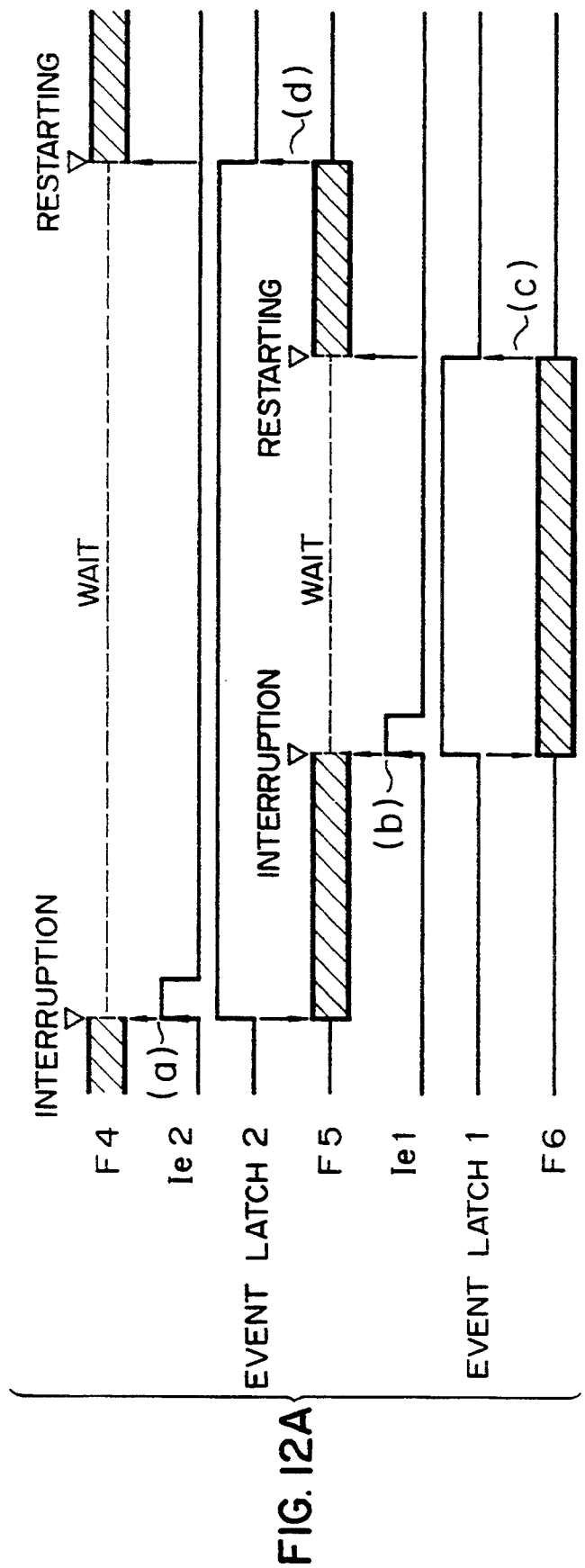
FIG. 12A is a diagram showing operation timing via the first memory data buffer (MD1) 48 of event driven control.

FIG. 12A shows a timing chart in case the event input is supplied in the order represented as Ie2→Ie1 (where priority is represented as Ie2<Ie1). In the state before the event input is inputted, F4 included in the functions F4 to F7 assigned as an event function is executed. A loop is formed as F0→F1→F2→F3→F4 (①) in FIG. 12B).

Assuming now that the event input Ie2 changes to "1" at illustrated timing (a), the F4 function which is being executed is interrupted and the execution of function F5 is then started. A loop is formed as F0→F1→F2→F3→F5 (② in FIG. 12B).

If Ie1 changes to "1" at illustrated timing (b) before execution of the F5 function is finished, execution of function F5 is also interrupted and execution of function F6 is started. In case no input has a higher priority than that of Ie1, processing is continued in the loop represented as F0→F1→F2→F3→F6 until processing of the F6 function is finished, i.e., until the program itself constituting the F6 function clears an event latch 1 (③ in FIG. 12B).

If the event latch 1 is cleared by the F6 program at illustrated timing (c), processing of function F5 which has been interrupted is restarted (④ in FIG. 12B), and an event latch 2 is cleared by the program of F5. Processing is thus finished (d).

If the event latch 2 is cleared, execution of function F4 is restarted.

Figure 12B:
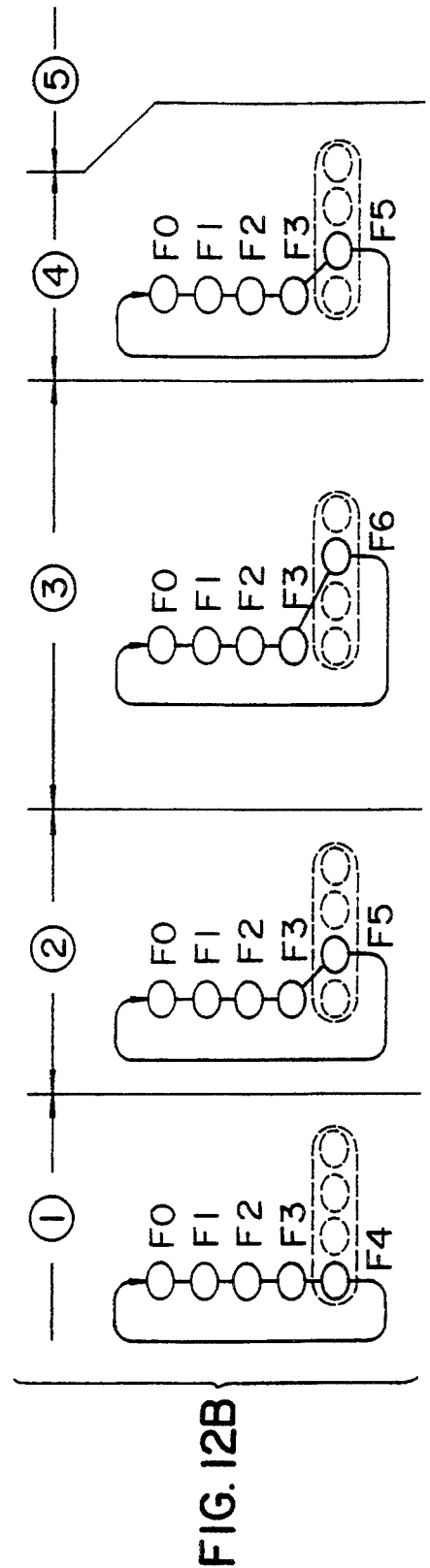

In the example shown in FIGS. 12A and 12B, the case where event inputs are generated in order of low priority has been described. In the case where an input having a lower priority is inputted later, however, processing of a function having a low priority is started after processing of a function having a high priority has been finished.

PIPELINE CONTROL

A series of operations performed by the selected address register ARi and status register SRi as described before by referring to FIG. 8, i.e., ① reading information from the micro EPROM, ② decoding, ③ reading source register and processing, and ④ writing information into the destination register can undergo pipeline control by inserting latches between circuits executing respective functions. High speed multifunction control by using piepline control will hereafter be described.

Figure 13:
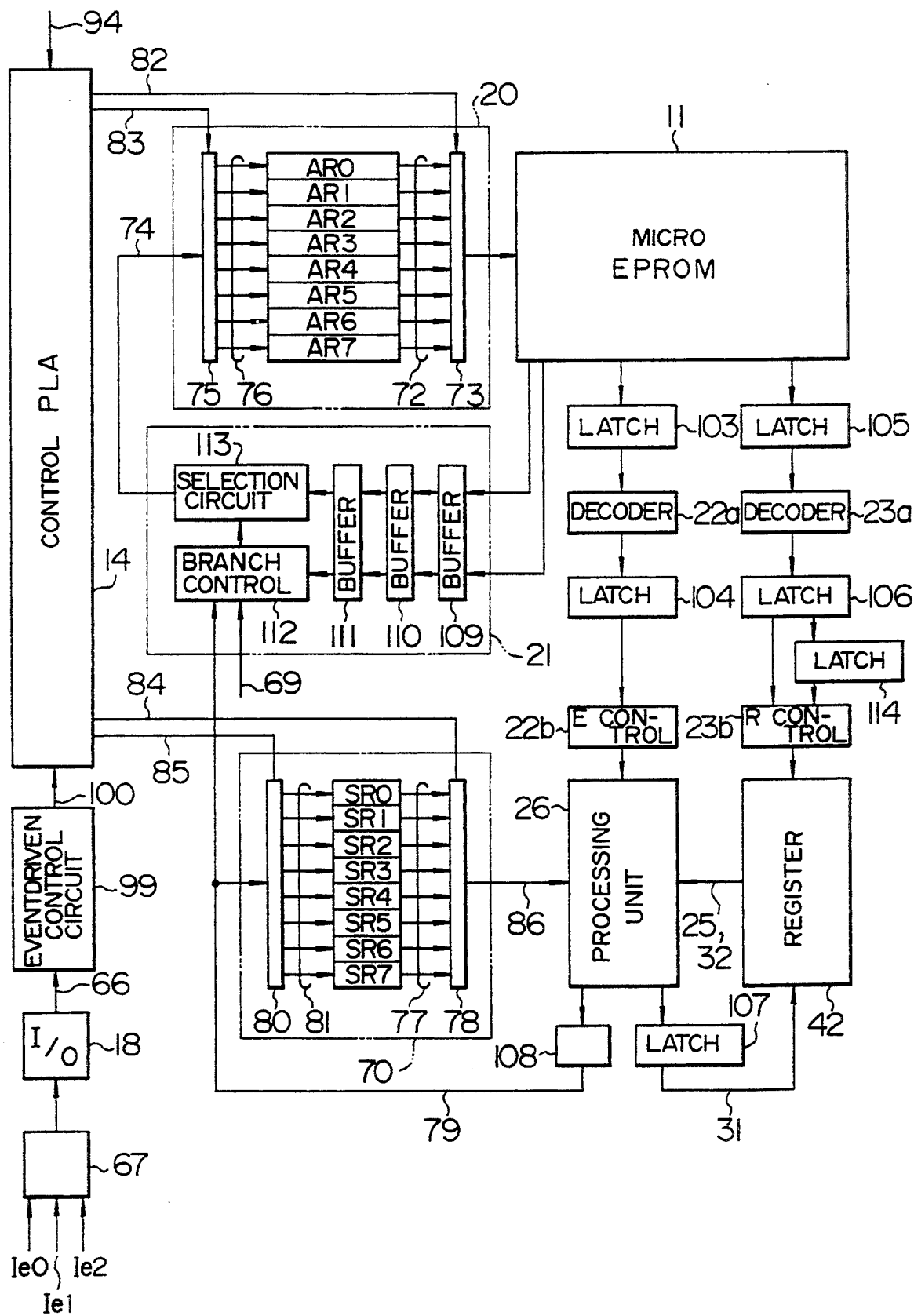
FIG. 13 is a configuration diagram showing an address register, a status register and associated components used in performing pipeline control

FIG. 13 shows a second configuration example of a control circuit which is based on FIG. 8 and which allows pipeline control. The difference between the configuration of FIG. 13 and that of FIG. 8 will now be described.

(1) The processing control circuit 22 disposed between the micro EPROM 11 and the processing unit 26 is divided into a decoder 22a and a control circuit 22b. The register control circuit 23 disposed between the micro EPROM 11 and the register circuit 42 is divided into a decoder 23a and a control circuit 23b. In addition, latches 103, 104, 105 and 106 are disposed at positions illustrated in FIG. 13.

(2) A latch 107 is disposed between the processing unit 26 and the write bus 31. And, a latch 108 is disposed between the processing unit 26 and the status signal line 79.

(3) The address control circuit 21 comprises a first delay buffer 109, a second delay buffer 110, a third delay buffer 111, a branch control circuit 112 controlled by the status signal line 79 and the port data line 69, and a next address selection circuit 113. The output line 74 of the address control circuit 21 is inputted to the address register circuit 20.

In the above described circuit configuration, a series of operations is executed as follows.

(A) : T0 cycle

Selection information for selecting address register Ari is outputted from the control PLA 14 onto the address register output control line 82. By using contents of the ARi as the address, data in the micro EPROM 11 is read out. That data is taken into the latches 103 and 105 and the first delay buffer 109.

(B) : T1 cycle

The contents of the latches 103 and 105 are decoded by the decoder circuits 22a and 23a. The contents thus decoded are taken into the latches 104 and 106, respectively. In addition, data is transferred from the first delay buffer 109 to the second delay buffer 110.

(C) : T2 cycle

On the basis of contents of the latches 104 and 106, respectively, the control circuits 22b and 23b generate control signals and perform a reading as the source register and an outputting as selection information from the control PLA 14 onto the status register output control line 84. As a result, processing is executed in the processing unit 26 by using the carry flag CF and the zero flag ZF. And, the result is taken into the latches 107 and 108. Further, data is transferred from the second delay buffer 110 to the third delay buffer 111. And, data of the latch 106 is transferred to a latch 114.

(D) : T3 cycle

Via the write bus 31, the contents of the latch 107 are written into a destination register selected on the basis of data of in the latch 114. In addition, status register selection information is generated on the status register input control line 85. Status register data generated as a result of processing is taken into the status register SRi. Further, the next address is selected on the basis of information of the next address control field of the micro EPROM already taken into the third delay buffer. In accordance with a signal supplied from the control PLA 14 onto the address register input control line 83, the next address is taken into the address register ARi. The series of operations is thus finished.

Figure 14A:
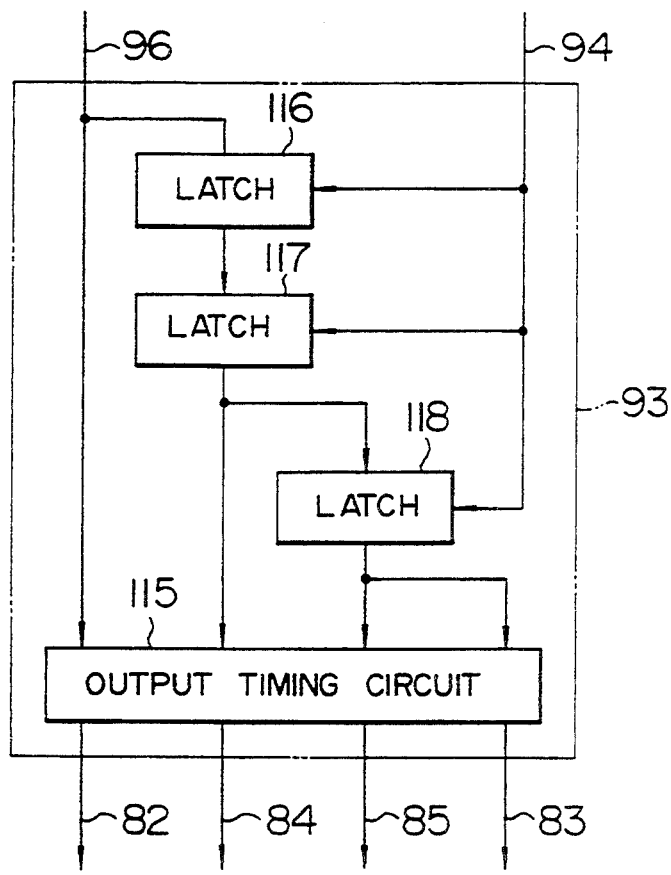
FIG. 14A is a diagram showing the configuration of an output circuit of FIG. 13.

The series of pipeline control operations heretofore described become possible by using a delay latch in the output circuit 93 included in the control PLA 14 as shown in FIG. 10 and by configuring the output circuit 93 as shown in FIG. 14A. That is to say, latch circuits 116, 117 and 118 initially cleared by the reset signal 94 are inserted between the control output line 96 extending from the OR plane 89 of the PLA and outputs 82, 83, 84 and 85 of the output circuit 93. Respective latch circuits successively latch the input signal on the basis of the clock signal, and operate as shown in FIG. 14B.

Figure 14B:
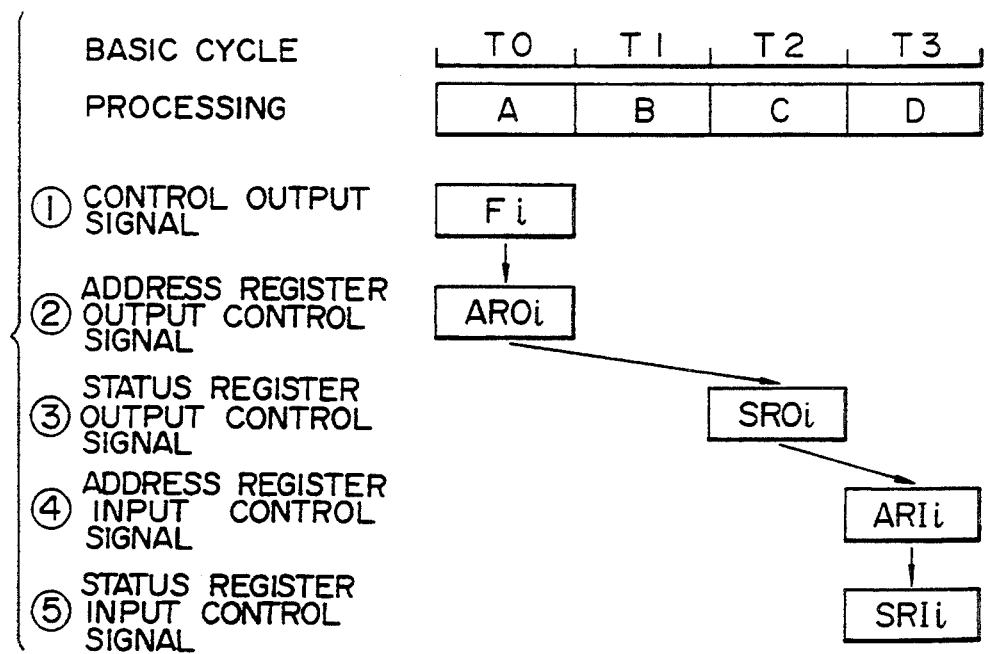
FIG. 14B is a diagram showing the operation sequence of the circuit of FIG. 13.

In FIG. 14B, A to D represent a series of functions processed in cycles T0 to T3. In the T0 cycle, selection information AROi of the address register ARi is outputted onto the address register output control line 82 via an output timing circuit 115 on the basis of a control output signal Fi (①) outputted onto the control output line 96 of the PLA.

On the other hand, a signal on the control output line 96 is inputted to the latch circuit 116. Further, the output of the latch circuit 116 is inputted to the latch circuit 117. Therefore, the output of the latch circuit 117 is delayed by two cycles. In the T2 cycle, a selection signal SROi of the status register SRi is outputted onto the status register output control line 84 (③).

Further, the output of the latch circuit 117 is delayed by one cycle in the latch circuit 118. In the T3 cycle, an address register input control signal ARIi (④) and a status register input control signal SRIi (⑤) are outputted. And, a series of operations for executing one word of a microinstruction constituting a specified function Fi are carried out.

Figure 15:
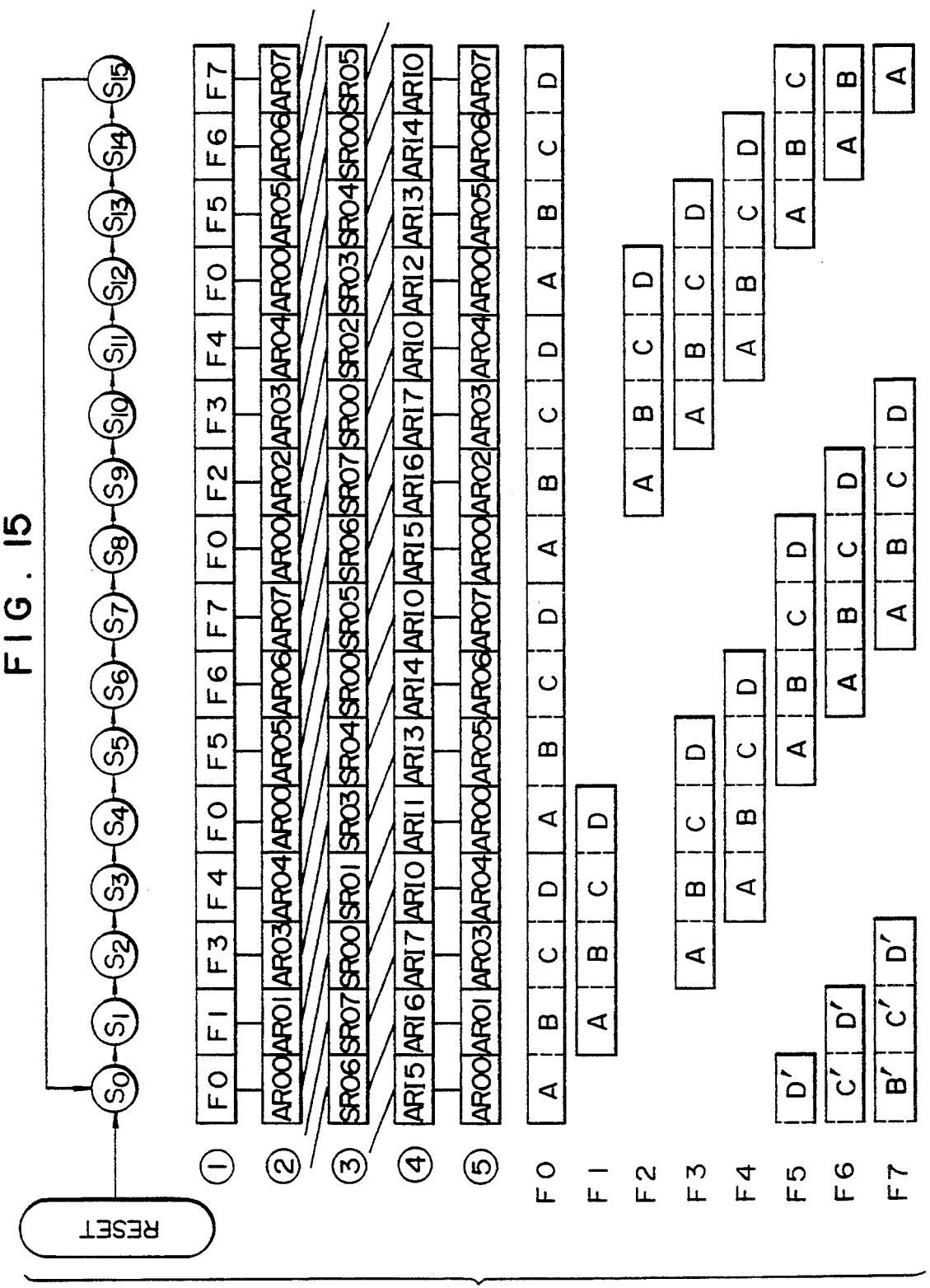
FIG. 15 is a diagram showing the sequence used when pipeline control is performed by the circuit of FIG. 13.

FIG. 15 shows an example obtained by applying pipeline control to the control example shown in FIGS. 9A and 11A. In states $S_0$ to $S_{15}$, respective functions Fi (F0 to F7) to be executed are outputted, respectively (①). In accordance with the signal Fi, control ② to ⑤ is performed by the circuit of FIG. 14A. By the control heretofore described, a series of control operations A to D as illustrated is executed with respect to each of the functions F0 to F7. That is to say, processing A to D of some function is executed in all of the states $S_0$ to $S_{15}$. Illustrated control B', C' and D' is not executed in the first loop started from the reset, but is executed in the second and succeeding loops.

In the example heretofore described by referring to FIGS. 13, 14A, 14B and 15, the number of the control status registers SR 70 is equivalent to the number of address latches, i.e., 8. The original object of providing status registers is to hold information such as zero and carry generated in processing executed at a certain instruction step so that such information may be used at a different instruction step which will be executed later. In a processor such as the subprocessor described in the present embodiment in which execution of one step of a microinstruction terminates generation of a branch condition and generation of a branch address, therefore, status holding for a long time for the purpose of condition branch becomes unnecessary provided that the status output is held for the execution interval of the one step. That is to say, the need to provide as many status registers as address latches become unnecessary. It is also possible to provide only one latch capable of holding the status output during only the instruction cycle. In this case, complicated processing such as double length processing implemented by using an instruction comprising a plurality of steps can be implemented as follows, although the execution efficiency is worsened. For example, in case it is desired that carry information generated as a result of execution at a first instruction step is used as increment information at the next instruction step, this can be attained by producing a program in which a +1 instruction is described at the destination specified when carry =1 as a result of processing performed at the first instruction step; whereas to instruction is described at the destination specified when carry =0.

Figure 16:
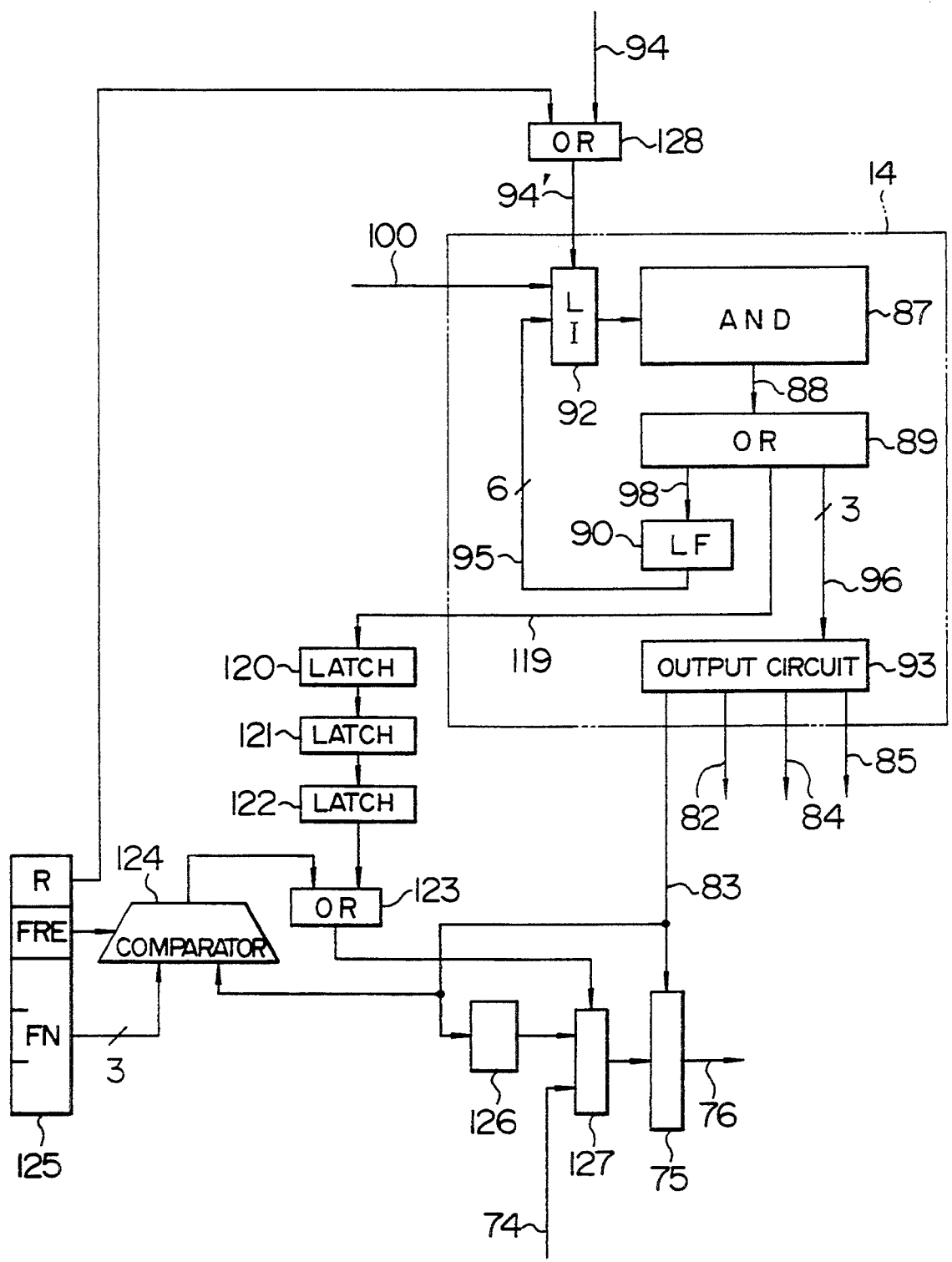
FIG. 16 is sa configuration diagram of an initial value control circuit.

FIG. 16 shows the configuration of a peripheral circuit of the control PLA for performing initial value setting of the address register AR and reset control of the subprocessor 6. The control PLA 14 of FIG. 16 is obtained by adding an initial address control line 119 to the control PLA 14 of FIG. 10 having the output circuit 93 described before with reference to FIG. 14A.

As described before by referring to FIGS. 8 and 10, the address register output control line 83 included in the output of the output circuit 93 controls the address register input multiplexer 75 for selecting inputs supplied to the address registers AR0 to AR7.

In FIG. 16, the following circuit is added to the above described circuit. The signal on the initial address control line 119 is successively delayed by 3-stage latch circuits 120, 121 and 122. The output of the last stage latch circuit 122 is connected to one input of the first logical sum (OR) circuit 123. The other input of the OR circuit 123 is connected to the output of a comparator 124 which is controlled by a function reset enable bit (FRE) stored in a command register 125. Inputs of the comparator 124 are the address register input control line 83 and a function number bit (FN) stored in the command register 125. The address register output control line 83 is connected to an initial address generation circuit 126 as well. The output of the initial address generation circuit 126 is inputted to a selector circuit 127 controlled by the OR circuit 123. The other input of the selector circuit 127 is connected to the output 74 of the address control circuit 21.

Initial value setting of the address register AR in the circuit configuration heretofore described, i.e., setting of initial address $AI_i$ of the micro EPROM storing therein the program of function Fi and reset control will now be described by referring to FIGS. 16 and 17. As compared with FIG. 11A, information of an initial value setting specifying bit (I) for supplying information onto the initial address control line 119 is added in FIG. 17. Description of ② in FIG. 17 is the same as that of FIG. 11A with the exception of prescription I=0.

In both FIG. 11 and FIG. 17, Fi is described in the control field. In reality, however, 3-bit numerical data "i" is written. That is to say, if I=1 and Fi is described in the control field, 3-bit data "i" is set in 3 low-order bits of the address register $AR_i$ as an initial address. Logic "0"s are set into all of the high-order bits excepting the 3 low-order bits.

In FIG. 16, the output (I) on the initial address control line 119 is outputted at the same timing as that of the output on the control output line 96. The output (I) on the initial address control line 119 is delayed by 3 cycles by the latch circuits 120, 121 and 122. The output on the control output line is delayed by 3 cycles by the latch circuits 116, 117 and 118. Information of the initial value setting specifying bit (I) functions as the selection signal of the selector circuit 127 via the OR circuit 123. On the other hand, the numerical value "i" is outputted onto the address register input control line 83. The numerical value "i" functions as a control signal of the address register input multiplexer 75 and becomes the input data of the initial address generation circuit 126. The initial address generation circuit 126 functions to place "i" in the 3 low-order bits and "0" in other high-order bits to generate an initial address.

In case the initial value setting specifying bit (I)=0, the address control circuit output line 74 is selected in the selector circuit 127. Data read out from the micro EPROM is thus inputted to the address register $AR_i$ via the address register input multiplexer 75.

In case I=1, the output of the initial address generation circuit 126, i.e., the initial address is selected in the selector circuit 127 and is inputted to the address register $AR_i$ via the address register input multiplexer 75. In FIG. 17, the operation is started from a S0' state by the reset start. In states S0' to S7' the initial address (low-order data: 0 to 7, high-order data: 0) is supplied successively to address registers F0 to F7 (① in FIG. 17). Thereafter, the operation described before with reference to FIG. 11A (② in FIG. 17) is started, and then the loop operation is performed.

The command register (RCMND) 125 is a register for performing reset control of the subprocessor 6 and has a 7-bit configuration as shown below.

| | $b_6$ | $b_5$ | $b_4$ | $b_3$ | $b_2$ to $b_0$ |
|---|---|---|---|---|---|
| RCMND | RA | RB | FREA | FREB | FN |

Meaning of respective portions are as follows.
RA: Totally reset subprocessor channel A
RB: Totally reset subprocessor channel B
FREA: Reset the function described in FN among functions of the subprocessor channel A
FREB: Reset the function described in FN among functions of the subprocessor channel B
FN: Describe the function number (Fi) when FREA=1 or FREB=1.

The command register 125 is disposed in the memory space of the CPU 2 shown in FIG. 2. The CPU 2 can gain access to the command register 125. In FIG. 16, a command register 125 relating to control of one channel is shown. However, bit R of FIG. 16 corresponds to the above described RA or RB, and FRE of FIG. 16 corresponds to the above described FREA or FREB.

If the bit R of the command register 125 is set at "1", that information is supplied to the input latch 92 via a second logical sum (OR) circuit 128 and a reset signal line 94' as a reset signal. The whole control PLA 14 is thus controlled to assume the reset state. That is to say, the whole control PLA 14 is controlled equally to the case where "1" is supplied to the reset signal line 94. If the R bit is thereafter set at "0", the reset is cancelled, and control is restarted from the initial state S0' shown in FIG. 17.

If the function number Fi is set into the FN bits (3 bits) of the command register 125 and the relation that FRE bit=1 is satisfied, the comparator 124 is enabled. At a timing where the value of the FN bit becomes equal to the value of the address register input control line 83, "1" is outputted from the comparator 124 to control the selector circuit 127 via the OR circuit 123. From the selector circuit 127, a value obtained by modifying the output of the initial address generation circuit 126, i.e., the value of the above described address register input control line 83 is inputted to the address register $AR_i$ via the address register input multiplexer 75. As a result, only function Fi specified in the FN bits of the command register 125 is reset. As a result of the relation FRE bit=0, microprogram of the function Fi is restarted from the initial address. At this time, functions other than the function Fi are not affected, and the program is continued.

PROGRAMMABLE I/O

Figure 18:
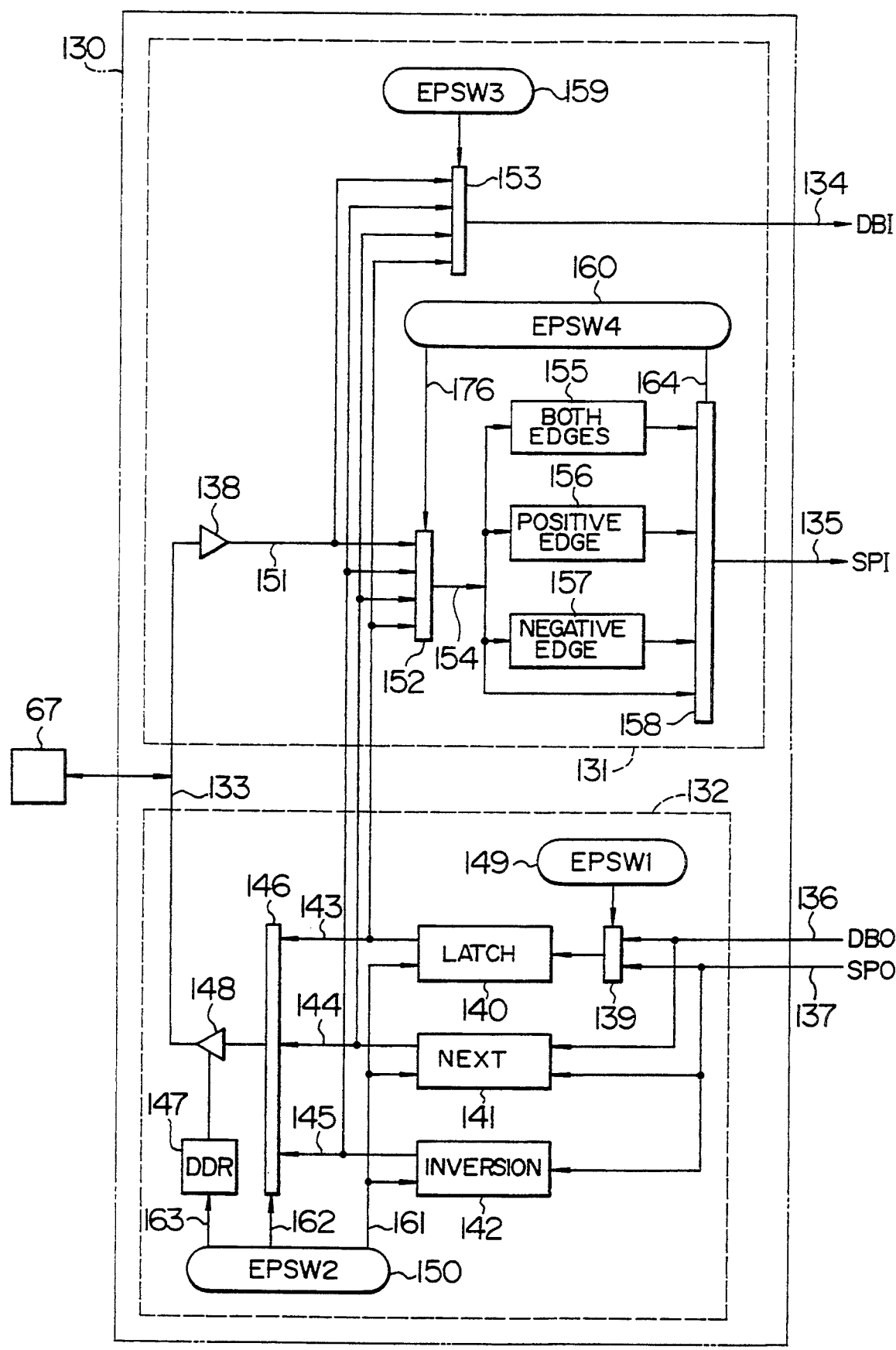
FIG. 18 is a configuration diagram of a programmable I/O.

The programmable input/output port (programmable I/O) 8 shown in FIG. 2 will now be described. FIG. 18 shows configuration 130 of the programmable I/O 8 corresponding to one bit. As described before in connection with the port specifying field of the micro EPROM, the programmable I/O comprises a plurality of I/O bits as shown in FIG. 18 and is specified by the information of the port specifying field.

The programmable I/O bit 130 comprises an output circuit 132 and an input circuit 131. The output circuit 132 is connected to the terminal 67 via terminal wiring 133 and has an output line (DBO) 136 extending to the data bus and an output line (SPO) 137 extending to the subprocessor. The input circuit 131 is connected to the terminal 67 via the terminal wiring 133 and has an input line (DBI) 134 extending to the data bus and an input line (SPI) 135 extending to the subprocessor.

The output circuit 132 comprises a selector 139 for selecting the DBO 136 and SPO 137, a latch output circuit 140 controlled by the output of the selector 139, a next level output circuit 141 supplied with the SPO 137 as an input, an inversion output circuit 142, an output selector 146 so supplied with output lines 143, 144 and 145 respectively from the above described latch output circuit 140, next level output circuit 141 and inversion output circuit 142 as to select either one of the output lines 143, 144 and 145, a data direction register (DDR) 147, and an output buffer 148 so controlled by the data direction register (DDR) 147 as to output data onto terminal wiring 133.

Further, the selector 139 is connected to a non-volatile switch circuit (EPSW1) 149 using EPROM devices. Further, the output selector 146, the DDR 147, the latch output circuit 140, the next level output circuit 141 and the inversion output circuit 142 are connected to a non-volatile switch circuit (EPSW2) 150.

The input circuit 131 comprises an input buffer 138 connected to the terminal wiring 133, a first input selector 152 having an output line 151 of the input buffer 138 and the above described output lines 143, 144 and 145 as its input, a second input selector 153 having the output line 151 of the input buffer 138 and the above described output lines 143, 144 and 145 as its input, a both edges detection circuit 155 supplied with an output 154 of the first input selector 152 at its input, a positive edge detection circuit 156 supplied with the output 154 of the first input selector 152 at its input, a negative edge detection circuit 157 supplied with the output 154 of the first input selector 152 at its input, and a subprocessor input selector 158 supplied with the output 154 of the first input selector and outputs of the detection circuit 155, the positive edge detection circuit 156 and the negative edge detection circuit 157.

Selectors 153, 152 and 158 are connected to non-volatile switch circuits (EPSW3 and EPSW4) 159 and 160. The functions of principal circuits will hereafter be described.

Latch output circuit 140:

The latch output circuit 140 latches write data supplied from either the output line 136 of the data bus included in the common bus 9 as shown in FIG. 2 or the output data line 137 coming from the subprocessor 6.

Next level output circuit 141:

The next level output circuit 141 comprises first and second latch circuits. Data of a first latch written via the data bus is transferred to a second latch connected to the output line 144 by an output signal from the subprocessor.

Inversion output circuit 142:

The circuit 142 performs inversion operation upon the output signal of the subprocessor.

Both edge detection circuit 155:

The circuit 155 detects a rising edge or a falling edge of a signal inputted from the terminal 67 and sets a flip-flop. If readout from the subprocessor is performed, the contents of the flip-flop are outputted and the flip-flop is cleared.

Positive edge detection circuit 156:

The circuit 156 detects a rising edge of a signal inputted from the terminal 67, thereby a flip-flop being set. If readout from the subprocessor is performed, the contents of the flip-flop are outputted and the flip-flop is cleared.

Negative edge detection circuit 157:

The circuit 157 detects a falling edge of a signal inputted from the terminal 67, thereby setting a flip-flop. If readout from the subprocessor is performed, the contents of the flip-flop are outputted and the flip-flop is cleared.

EPSW1:

The circuit EPSW1 defines whether the input of the latch output circuit 140 should be coupled to the data bus or should be coupled to the subprocessor output.

EPSW2:

The circuit EPSW2 defines the output function and it can define the following functions.

① It supplies initial data to the latch output circuit 140, the next level output circuit 141 and the invesion output circuit 142 via an initial data line 161.

② It defines which output should be selected from outputs of the latch output circuit 140, the next level output circuit 141 and the inversion output circuit 142 by using a selection line 162.

③ It supplies initial data to the data direction register (DDR) via an initial direction control line 163 to define the initial data direction of the terminal 67 (input or output). The above described DDR is connected to the data bus as well, and it is also possible to reset data from the main processor on occasion.

EPSW3:

The circuit EPSW3 defines whether the input of the data bus should be the input from the terminal 67, any one of outputs of the latch output circuit 140, the next level output circuit 141 and the inversion output circuit 142, or inhibited.

EPSW4:

The circuit EPSW4 defines the input function to the subprocessor, and it can define the following functions.

① By using an input data selection line 176, the EPSW4 defines whether the input data source of the subprocessor should be the input from the terminal 67, the output of the latch output circuit, the output of the next level output circuit 141 or the output of the inversion output circuit 142.

② By using an input function selection line 164, the EPSW4 defines whether the input function to the subprocessor should be both edges detection, positive edge detection, negative edge detection or level input.

By initially programming the non-volatile switch circuits (EPSW 1 to 4) heretofore described, various desired functions can be realized.

Figure 19A:
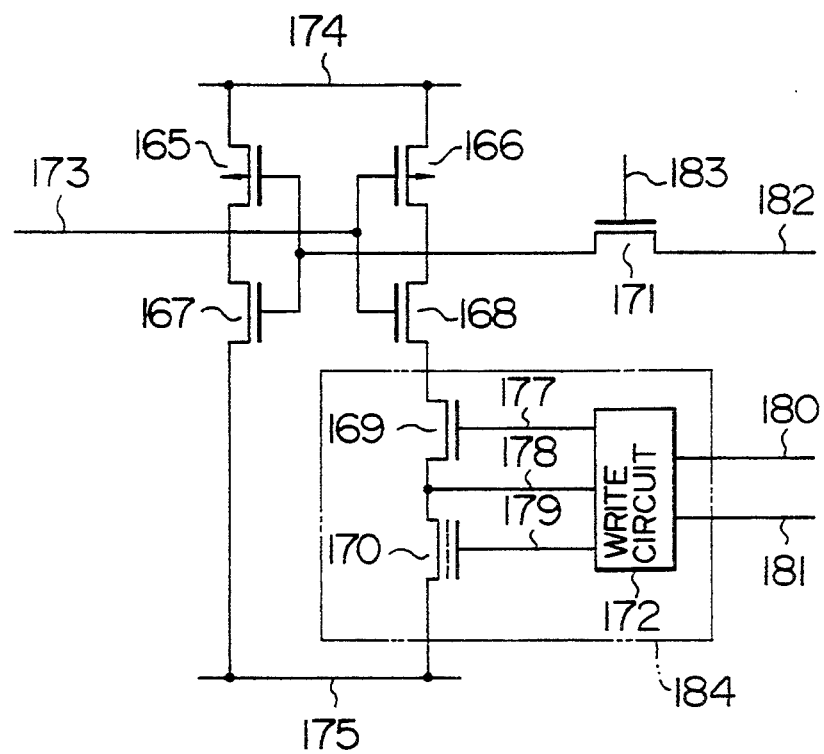
FIGS. 19A and 19B are configuration diagrams of non-volatile switch circuits.
Figure 19B:
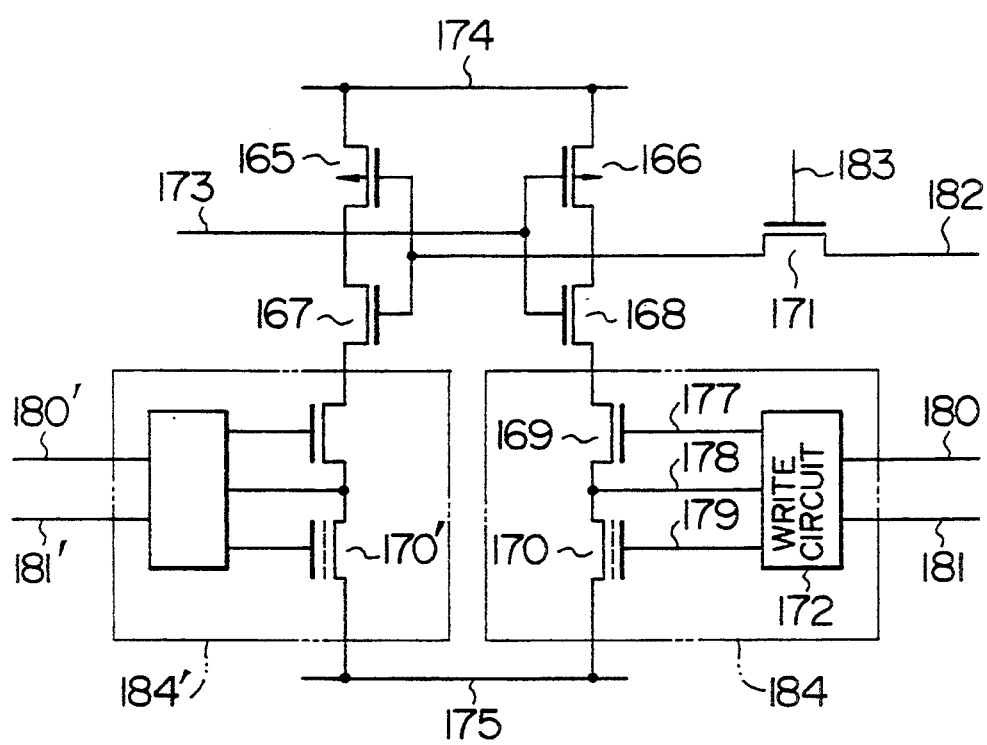

FIGS. 19A and 19B show examples of the configuration of a non-volatile switch circuit. A first example shown in FIG. 19 comprises PMOS transistors 165 and 166, NMOS transistors 167 and 168, an NMOS transistor 171 for yielding test data, and an EPROM circuit 184 including an NMOS transistor 169 having high withstanding voltage, an EPROM device 170 and an EPROM write circuit 172. Source electrodes of the PMOS 165 and the PMOS 166 are connected to a power supply line 174. Numeral 175 denotes a ground line. In each of a transistor pair comprising the PMOS 165 and the NMOS 167 and another transistor pair comprising the PMOS 166 and the NMOS 168, drain electrodes of both transistors are coupled together and gate electrodes are coupled to identical gate wiring, resulting in a complementary structure. Further, the output terminal of one transistor pair is coupled to the input terminal of the other transistor pair and the output terminal of the other transistor pair is coupled to the input terminal of one transistor pair, resulting in cross coupling.

Drain wiring of the transistor pair comprising the PMOS 165 and the NMOS 167, i.e., wiring pulled out from gate wiring of the transistor pair comprising the PMOS 166 and NMOS 168 becomes an output line 173. Further, one electrode of the NMOS transistor 171 is connected to the drain wiring of the transistor pair comprising the PMOS 166 and the NMOS 168, i.e., the gate wiring of the transistor pair comprising the PMOS 165 and the NMOS 167. Test data is supplied to the cross coupled circuit via the NMOS transistor 171. Inputs of an EPROM write circuit 172 are connected to a high voltage power supply line 180 for supplying write voltage (12 V) and a write data line 181. Output lines of the write circuit 172, i.e., write control lines 177, 178 and 179 are connected to gate electrodes and drain electrodes of the NMOS 169 having high withstanding voltage and the EPROM device 170 to control writing information into the EPROM device 170. The input-output relationship at the time of writing, i.e., at the time when 12 V is applied to the high voltage power supply line 180, is shown in Table 6.

TABLE 6

|  | Voltages on respective control lines (V) | | |
| --- | --- | --- | --- |
|  | 177 | 178 | 179 |
| Input voltage (V) | 5 | 0 | 9 | 12 |
| of write data line 181 | 0 | 0 | 0 | 0 |

The EPROM device used in the present embodiment is a device of ultraviolet ray erasing type. As a result of radiation of ultraviolet rays, the threshold of the EPROM device becomes approximately 1 V. If writing is executed by applying a voltage of 5 V to the data line 181 under the state that data is erased, the threshold of the EPROM device rises to approximately 7 V. If the control lines 177 and 179 are supplied with 5 V and the control line 178 is held in the floating state excepting at the time of writing, therefore, the EPROM device 170 becomes conductive in the erase state whereas it becomes nonconductive in the write state.

When the voltage of the power supply line 174 is changed from the voltage (0 V) equivalent to that of the ground line to 5 V in the write state, i.e., in the nonconductive state, 5 V is outputted on the output line 173 without fail because of the configuration heretofore described. If circuit design is such that 0 V is outputted onto the output line 173 without fail when the voltage of the power supply line 174 is changed from the voltage (0 V) equivalent to that of the ground line 175 to 5 V in the conduction state, therefore, it becomes possible to fix the voltage on the output line 173 at the time of power supply coupling depending upon the erase state or the write state of the above described EPROM device 170. Therefore, the PMOS 165 is so set as to have lower current conduction capability than that of the PMOS 166 and the NMOS 168 is so set as to have lower current conduction capability than that of the NMOS 167.

The NMOS 171 is a transistor for supplying arbitrary data to the above described cross coupled circuit in the state that the EPROM device 170 is erased. If data is supplied to an electrode 182 and 5 V is applied to a gate electrode 183, data can be inputted to the cross coupled circuit. Even if the voltage of the gate electrode 183 is restored to 0 V after data has been supplied in the above described state, that value is held. In this case, data on the output line 173 is equivalent to data obtained by inverting data supplied via the NMOS 171.

FIG. 19B shows a second configuration example of a non-volatile switch circuit. In this example, an EPROM circuit 184' having the same configuration as that of the EPROM circuit 184 described in the first example is inserted between the NMOS 167 and the ground line 175 of the first example. In case of this example, it is possible to stably fix the output 173 without setting the MOS transistors into unbalanced states, by bringing only one of the EPROM devices 170 and 170' into the write state. In case arbitrary data is to be supplied to the cross coupled circuit, data can set by bringing both of the EPROM devices 170 and 170' in the erased state and controlling the NMOS 171' in the same way as the first example.

Figure 20:
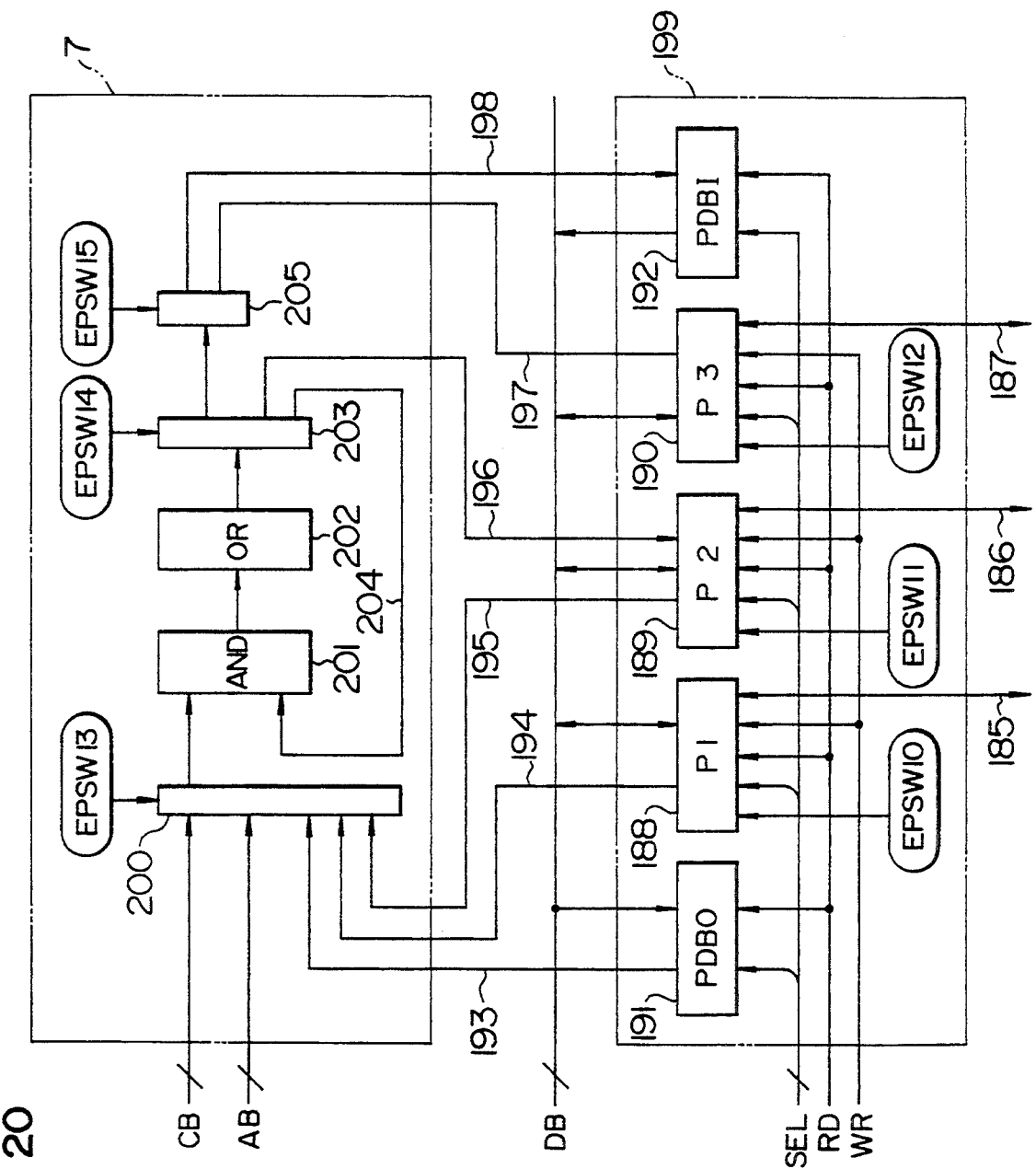
FIG. 20 is a configuration diagram of a PLD.

FIG. 20 shows a detailed configuration of the PLD 7 and the second programmable I/O port (PI/O2) 199 in the single chip microcomputer shown in FIG. 2. The PLD 7 comprises an input selector 200, a logical product (AND) circuit 201, a logical sum (OR) circuit 202, an output circuit 203, an output multiplexer 205, and feedback wiring 204 from the output circuit 203 to the logical product circuit 201. Among the above described components, the input selector 200, the output circuit 203 and the output multiplexer 205 are controlled by non-volatile switch circuits EPSW13, EPSW14 and EPSW15 using EPROM devices as described with reference to FIGS. 19A and 19B.

The programmable I/O port 199 comprises five ports PDBO 191, P1 188, P2 189, P3 190 and PDBI 192 each having an 8-bit configuration and each being connected to the 8-bit data bus DB included in the common bus. Further, each port is controlled by a selection signal SEL, a read signal RD and a write signal WR. Among the above described ports, three ports P0, P1 and P3 are characterized by non-volatile switch circuits EPSW10, EPSW11 and EPSW12, respectively, By this characterization, the ports PO, P1 and P3 are used for bilateral general-purpose I/0 ports for performing data transfer between connection lines 185, 186 and 187 for terminals and the data bus DB. In addition, the ports P0, P1 and P3 can also be used for data transfer between the connection lines 185, 186 and 187 and the above described PLD 7.

The port P1 can perform data inputting to the PLD 7 via an output line 194. The port P2 can perform data inputting to the PLD 7 via an output line 195 and data outputting from the PLD 7 via an input line 196. The port P3 can perform data outputting to the PLD 7 via an input line 197. The ports PDBO and PDBI are ports for exclusive use which are used only for communication with the above described PLD 7. Those port PDBO and PDBI do not have connection lines for terminals. The port PDBO is used as an input buffer for inputting data on the data bus DB to the PLD 7 via an output line 193. And, the port PDBI is used as an output buffer for outputting the output of the PLD 7 to the data bus DB via an input line 198. The function of respective non-volatile switch circuits (EPSW 10 to 15) will hereafter be described.

EPSW10:
The circuit EPSW10 defines whether the port P1 should be used as a general purpose port coupled to the data bus or should be used as a PLD input.

EPSW11:
The circuit EPSW11 defines whether the port P2 should be used as a general purpose port coupled to the data bus or should be used as a PLD input or a PLD output.

EPSW12:
The circuit EPSW12 defines whether the port P3 should be used as a general purpose port coupled to the data bus or should be used as a PLD output.

EPSW13:
The circuit EPSW13 controls the input selector 200 and defines which wiring should be connected to the input of the logical product (AND) circuit 201 included in the PLD 7. Inputs comprise inputs from the ports PDBO, P1 and P2, the address bus AB and a control bus CB containing the read signal RD, write signal WR and a clock signal.

EPSW14:
The circuit EPSW14 controls the output circuit 203 and defines the output polarity and the like.

EPSW15:
The circuit EPSW15 defines whether the PLD output should be outputted to the port P3 or should be outputted to the output buffer PDBI for the data bus.

WRITING AND TESTING OF EPROM

As heretofore described, the single chip microcomputer of the present embodiment comprises various circuits each using an EPROM device which is an electrically writable non-volatile semiconductor memory device. Data writing and testing with respect to this EPROM device are required.

Figure 21:
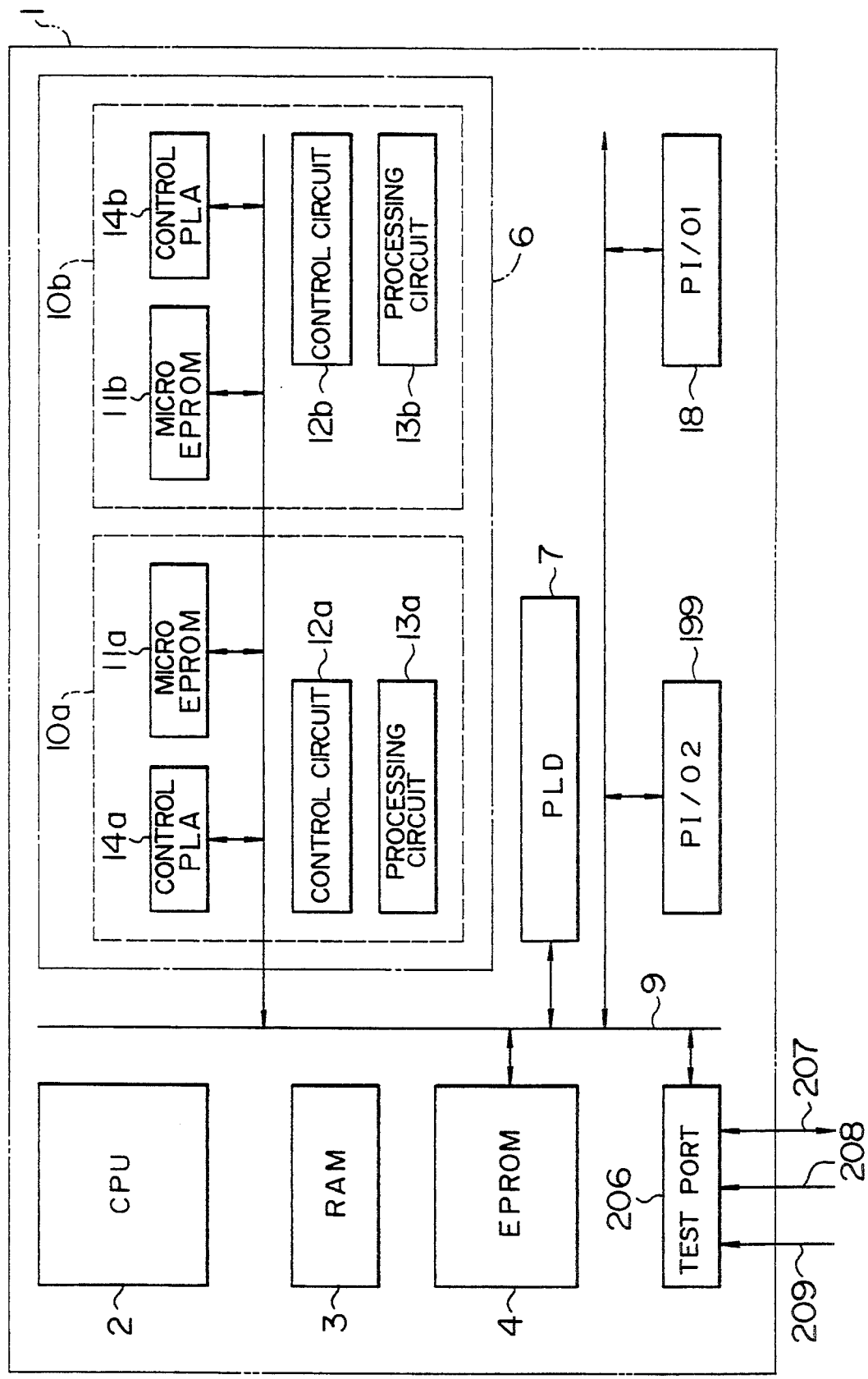
FIG. 21 is a configuration diagram for testing the single chip microcomputer.

FIG. 21 shows a configuration for implementing data writing and testing with respect to the EPROM. In the write mode, circuits containing an EPROM device, i.e., circuit modules of ① EPROM 4 for program,
② micro EPROM 11a of a subprocessor channel A 10a,
③ control PLA 14a,
④ micro EPROM 11b of a subprocessor channel B 10b,
⑤ control PLA 14b,
⑥ PLD 7,
⑦ first programmable I/O 8, and
⑧ second programmable I/O 199 are connected to the common bus 9.

On the other hand, circuit modules such as the CPU 2 and the RAM 3 which do not comprise an EPROM device are electrically interrupted from the common bus 9.

In such a state, necessary information is supplied from the outside of the semiconductor substrate 1 to respective circuit modules each comprising an EPROM device via a test port and the common bus 9 to perform writing and testing operations. Signal lines used to communicate with the outside of the semiconductor substrate 1 at this time comprise a test data line 207, a test address line 208 and a test control line 209.

Data to be written into the EPROM is inputted onto the test data line 207 at the time of a write operation, whereas data read out from the EPROM is outputted onto the test data line 207 at the time of a read operation. Onto the test address line 208, selection information of the EPROM is inputted. Onto the test control line 209, a test enable signal, and a write signal and a read signal for controlling a high writing voltage, a write operation and a read operation are supplied. That is to say, this microcomputer changes over from the normal instruction execution operation (normal mode) to the write mode in response to a signal supplied onto the test control line 209.

EPROM devices included in the above described circuit modules ① to ⑧ are assigned to an identical address space, i.e., those EPROM devices are so assigned that they may be continuously specified by the test address line 208 in the write mode. It is thus possible to write information by using a signal generated by a commercially available standard EPROM writer.

Figure 22A:
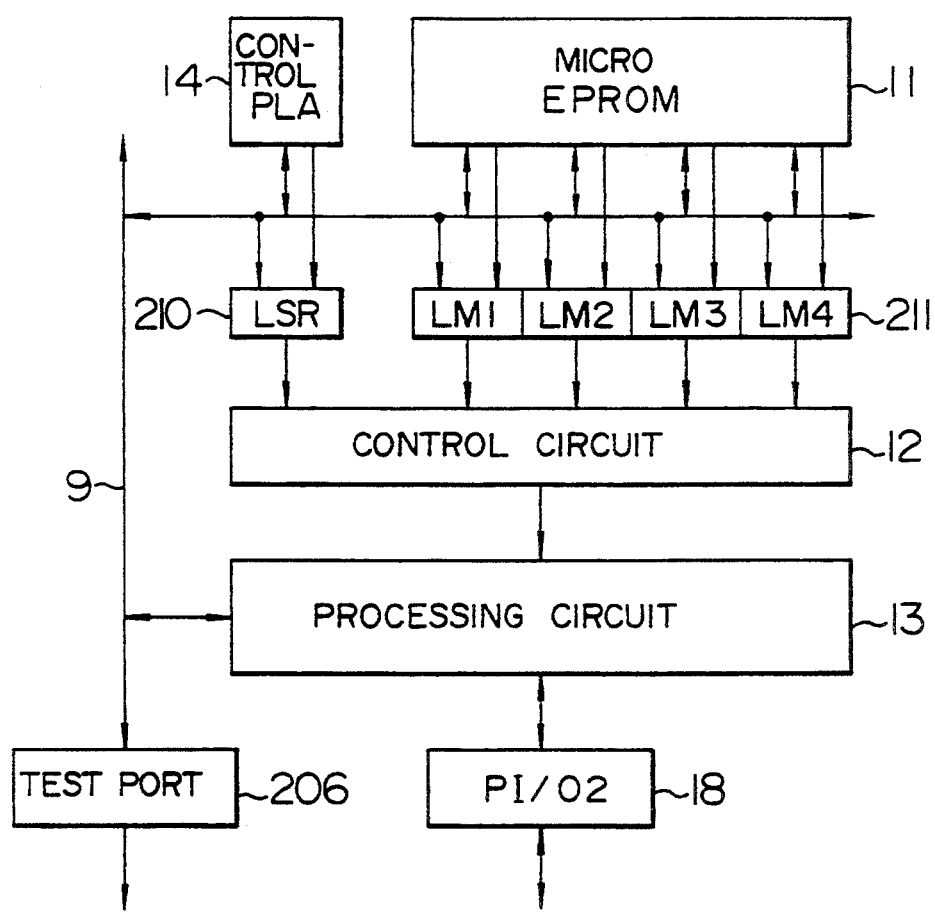
FIG. 22A is a configuration diagram for testing a subprocessor.

A method for testing the subprocessor will now be described. FIG. 22A shows a configuration of one channel of the subprocessor. The subprocessor test is performed in three stages described below, and its control is performed in response to signals applied onto the test control line 209.

(1) EPROM device test:
Device test of EPROM devices such as test of data holding characteristics is performed by using the above described write mode into the EPROM. That is to say, read/write test is carried out with respect to PROM devices included in the control PLA 4 and the micro EPROM 11 via the test port 206 and the common bus 9 shown in FIG. 22A.

Figures 1, 22B:
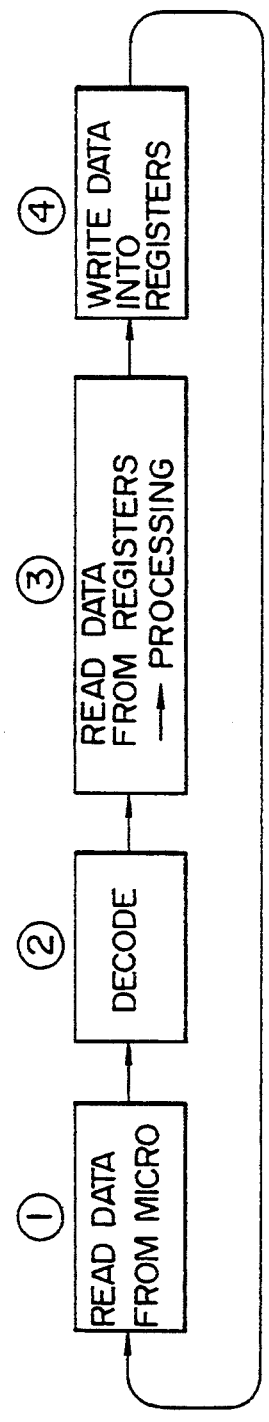
Figures 2, 22B:
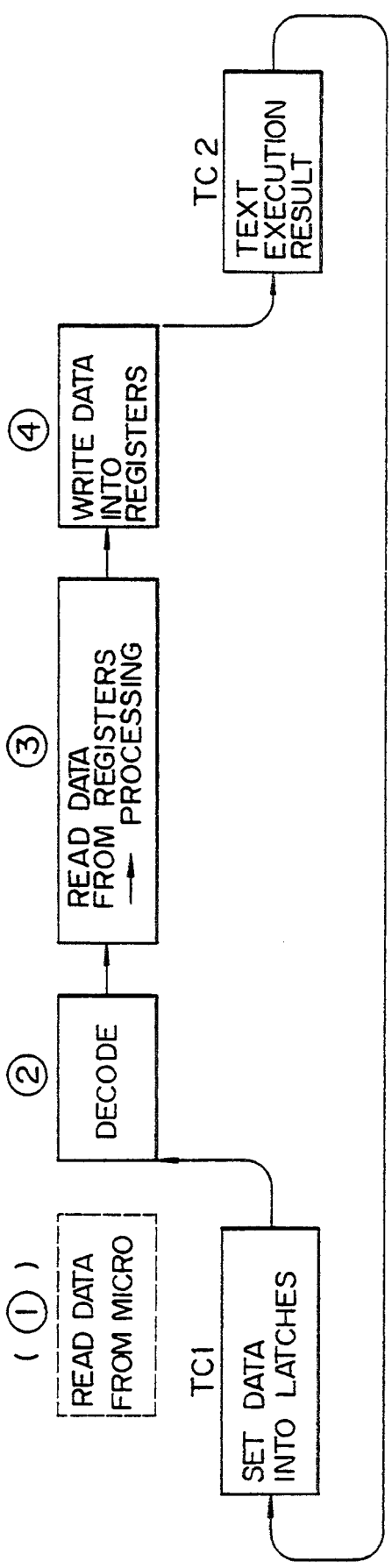

(2) Semidynamic test:

As shown in FIG. 22A, latch circuits 210 and 211 for test are disposed respectively between the control PLA 14 and the control circuit 12 and between the micro EPROM 11 and the control circuit 12. By using information latched in the latch circuits 210 and 211, the semidynamic test is performed. Its operation is shown in FIG. 22B. In the normal mode, there is executed a series of operations comprising ① micro EPROM read cycle, ② decode cycle, ③ register, status register SR read and processing execution cycle, and ④ register and status register SR write cycle. In the semidynamic test mode, however, cycle ① among the above described cycles is replaced by test cycle 1 (TC1).

In TC1, control data is set into the testing latch circuits 210 and 211 via the test port 206 and the common bus 9. That is to say, the same state as that obtained when the control signal from the control PLA 14 and data from the micro EPROM are received is produced. Further, initial data is set into a general purpose register included in the processing circuit 13. Manipulation of the TC1 heretofore described can be performed statically.

After respective data have been set, the above described cycles ② to ④ are consecutively executed. After the cycle ④ has been finished, the operation is temporarily stopped and a test cycle 2 (TC2) is started. In the TC2, the contents of the registers can be read out statically. By comparing the contents of the registers with expected values, therefore, the test result can be known.

In FIG. 22A, information of the micro EPROM 11 is so shown as to be inputted to the control circuit always via the latch circuit 211 for test. In the normal mode, however, this latch circuit 211 simply functions only to latch information of the micro EPROM.

(3) Dynamic test:

The control PLA 14 comprises a PLA for test which can be used only in this test mode. In the same way, the micro EPROM 11 comprises a test program region in a part of its address. Onto this test program region, a test program is written in the above described test mode of (1). The operation of this dynamic test mode is identical with that of the normal mode except that a PLA for test and a micro EPROM region for test are selected. That is to say, if this dynamic test mode is specified, the address of a micro EPROM region for test is specified as an initial address.

As heretofore described, the present invention makes it possible to enhance the flexibility of not only the software, but also the hardware and implement a single chip microcomputer optimum for a wide range of applications. Further, high speed processing of a plurality of functions becomes possible as a result of optimum pipeline control. Thus, performance and function reach a level which compares favorably with that of special purpose hardware.

In the present embodiment, an example using an EPROM of ultraviolet ray erasing type as the non-volatile semiconductor memory has been described. It is a matter of course that a similar effect can be obtained even when an EEPROM of electrical erasing type or the other type of non-volatile memory such as a ROM exclusively used for read out is employed or RAM. When the RAM is used instead of the non-volatile memory, a circuit for supplying data to the RAM at the initial state (just after power-on) of the operation is necessary. However, there is an advantage that real-time data writing is possible.

Further, it is also possible to connect the above described subprocessor 6, PLD 7, and programmable I/O 8 and 199 together outside the semiconductor substrate via the common bus.

Owing to the present invention, the general purpose property of a single chip microcomputer can be enhanced. In a wide range of application, the number of components included in the above described circuit around the single chip microcomputer can be reduced. Further, since the user can write logical information by hand, changes in the specification and logic, if any, can be rapidly dealt with. Together with shortening the development interval, the cost is also significantly reduced.

Further, since specifications for writing data into non-volatile devices are made equivalent to those for standard non-volatile semiconductor memories so that information may be written by using a standard PROM writer, a special writing apparatus is not required. The cost saving effect at this point is also significant.

We claim

1. A single chip microcomputer formed on a semiconductor substrate including a first processor, said first processor comprising:
   a) memory means for storing microinstructions;
   b) a processing circuit, having an arithmetic unit, which operates in response to said microinstructions stored in said memory means;
   c) a plurality of address registers for storing addresses for effecting access to said memory means to read out microinstructions for operating said processing circuit;
   d) a plurality of status registers each of which hold status information, including at least either one of zero information and carry information, generated as a result of processing performed in said processing circuit; and
   e) selecting means, including a programmable logic array, for selecting a pair of registers, consisting of one address register and one status register, from said plurality of address registers and said plurality of status registers, in response to information written into said programmable logic array from outside of said microcomputer, to supply an address to said memory means and status information to said arithmetic unit in said processing circuit.

2. A microcomputer according to claim 1, wherein said selecting means includes means for selectively supplying address data to said address registers.

3. A microcomputer according to claim 1, wherein said first processor further comprises:
   (f) a control register coupled to said selecting means, and
   said selecting means includes means for selectively supplying address data to said address registers in response to information stored in said control register.

4. A microcomputer according to claim 1, wherein said first processor further comprises:
   (g) terminal means for receiving a signal from outside of said microcomputer; and
   (h) control means, responsive to a signal supplied from said terminal means to an input thereof, for transferring information to said selection means, and said selection means includes means for selecting a pair of an address register and a status register in response to said information.

5. A microcomputer according to claim 1, wherein said control means comprises a plurality of terminals, and
said transfer means comprises:
a plurality of detection means for detecting transition points of signals supplied from said plurality of terminals; and
means for giving priority orders to said plurality of detected signals.

6. A microcomputer according to claim 1, wherein said memory means is a read only memory comprising an electrically writable non-volatile semiconductor memory device.

7. A microcomputer according to claim 1, wherein said microcomputer further comprises a second processor, and said second processor has the same configuration as that of said first processor.

8. A microcomputer according to claim 7, wherein said microcomputer further comprises a third processor including a CPU, and
said CPU is coupled to said first processor via a common bus.

9. A microcomputer according to claim 7, wherein said first processor and said second processor are connected together via first interface means.

10. A microcomputer according to claim 9, wherein said first interface means comprises means for holding a semaphore flag having a plurality of bits which are accessible to both said first and said second processors.

11. A microcomputer according to claim 7, wherein said microcomputer further comprises a third processor, and
said first processor is coupled to said second processor via a first interface means, and said first processor and said second processor are coupled to said third processor via a second interface means.

12. A microcomputer according to claim 8, wherein said first processor has an instruction set different from that of said third processor.

13. A microcomputer according to claim 8, wherein said third processor comprises interrupt processing means, and
said first processor comprises interrupt permission request means, said interrupt processing means being coupled to said interrupt permission request means.

14. A microcomputer according to claim 8, wherein said first processor further comprises second interface means and a first processor bus, and
said first processor bus is coupled to said third processor via said second interface means and said common bus.

15. A microcomputer according to claim 14, wherein said first processor bus is a bus that is directly accessible to said third processor.

16. A microcomputer according to claim 14, wherein said common bus comprises a data bus and an address bus, and
said second interface means is connected to a read signal line and a write signal line of said second processor, data transfer between said first processor and said third processor being performed in response to signals on said read signal line, said write signal line and said address bus.

17. A microcomputer according to claim 16, wherein said microcomputer includes memory means and terminal connection means connected to said common bus;
said first processor including a second processor bus and memory access means connected to said second processor bus, said data bus and said address bus;
said memory access means includes request means for requesting right of use of said common bus from said first processor; and
said memory access means gains access to said memory means and terminal connection means by executing an instructions identified in an instruction field of a read only memory of said first processor.

18. A microcomputer according to claim 17, wherein said terminal connection means is connected to an external memory disposed outside said microcomputer, and
said memory access means gains access to said external memory by executing said instruction.

19. A microcomputer according to claim 18, wherein said external memory comprises a dynamic random access memory, and said memory access means refreshes said dynamic random access memory by executing said instruction.

20. A single chip microcomputer according to claim 1, wherein said programmable logic array includes an AND-logic area and an OR-logic area, and at least one of said AND-logic area and said OR-logic area are formed with electrically writable non-volatile semiconductor memory devices.

21. A single chip microcomputer formed on a semiconductor substrate and including a first processor, said first processor comprising:
a) a memory storing microinstructions;
b) a processing circuit, having an arithmetic unit, connected to receive microinstructions from said memory;
c) a plurality of address registers storing addresses of memory locations of microinstructions in said memory;
d) a plurality of status registers each of which hold status information, including at least either one of zero information and carry information, generated as a result of processing performed in said processing circuit; and
e) selecting means, including a programmable logic array, for selecting, in an arbitrarily determined sequence, pairs of registers, each pair consisting of one address register and one status register from said plurality of address registers and said plurality of status registers, according to information written into said programmable logic array outside of said microcomputer, to supply addresses to read out microinstructions from said memory and to supply status information to said arithmetic unit in said processing circuit, so that said processing circuit performs a plurality of functions in said arbitrarily determined sequence.

22. A memory according to claim 21, further comprising a second processor having the same configuration as that of said first processor and being coupled to said first processor via a common bus, said first processor having an instruction set different from said second processor.

* * * * *